(12) United States Patent
Kanada et al.

(10) Patent No.: US 9,683,658 B2
(45) Date of Patent: Jun. 20, 2017

(54) HYBRID SYSTEM

(71) Applicant: TOYOTA JIDOSHA KABUSHIKI KAISHA, Toyota-shi, Aichi-ken (JP)

(72) Inventors: Toshiki Kanada, Anjo (JP); Ryuji Ibaraki, Miyoshi (JP); Yuji Yasuda, Miyoshi (JP); Atsushi Tabata, Okazaki (JP); Tatsuya Imamura, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/908,355

(22) PCT Filed: Jul. 28, 2014

(86) PCT No.: PCT/IB2014/001397
§ 371 (c)(1),
(2) Date: Jan. 28, 2016

(87) PCT Pub. No.: WO2015/015272
PCT Pub. Date: Feb. 5, 2015

(65) Prior Publication Data
US 2016/0169374 A1 Jun. 16, 2016

(30) Foreign Application Priority Data
Jul. 30, 2013 (JP) .................. 2013-158184

(51) Int. Cl.
*F16H 61/02* (2006.01)
*F16H 57/037* (2012.01)
(Continued)

(52) U.S. Cl.
CPC ......... *F16H 61/0265* (2013.01); *B60K 6/365* (2013.01); *B60K 6/387* (2013.01);
(Continued)

(58) Field of Classification Search
CPC ........ B60K 6/365; B60K 6/387; B60K 6/405; B60K 6/445; B60K 6/547;
(Continued)

(56) References Cited

U.S. PATENT DOCUMENTS

2006/0166778 A1* 7/2006 Tabata .................. B60K 6/405
475/159
2007/0298925 A1 12/2007 Kitahara et al.
(Continued)

FOREIGN PATENT DOCUMENTS

CN 101093014 A 12/2007
CN 101203396 A 6/2008
(Continued)

*Primary Examiner* — Jacob S Scott
(74) *Attorney, Agent, or Firm* — Andrews Kurth Kenyon LLP

(57) ABSTRACT

A hybrid system includes an engine, a speed change device, a differential device, a rotary machine, a first engagement device, a case, and a cover wall. The first engagement device is configured to shift the speed change device, and be actuated by hydraulic pressure. The first engagement device includes a first oil chamber. The rotary machine is arranged between the first engagement device and the engine. The case houses the rotary machine, the speed change device, the differential device, and the first engagement device, and is connected to the engine and has an opening on the engine side. The cover wall covers the opening, and operating oil is supplied to the first oil chamber via the cover wall.

6 Claims, 16 Drawing Sheets

(51) Int. Cl.
*F16H 57/031* (2012.01)
*F16H 37/08* (2006.01)
*B60K 6/365* (2007.10)
*B60K 6/405* (2007.10)
*B60K 6/445* (2007.10)
*B60K 6/547* (2007.10)
*F16H 3/72* (2006.01)
*B60K 6/387* (2007.10)
*F16H 61/00* (2006.01)
*B60K 6/38* (2007.10)
*F16H 57/02* (2012.01)

(52) U.S. Cl.
CPC .............. *B60K 6/405* (2013.01); *B60K 6/445* (2013.01); *B60K 6/547* (2013.01); *F16H 3/728* (2013.01); *F16H 37/0806* (2013.01); *F16H 57/031* (2013.01); *F16H 57/037* (2013.01); *B60K 2006/381* (2013.01); *B60Y 2200/92* (2013.01); *B60Y 2306/03* (2013.01); *B60Y 2400/406* (2013.01); *B60Y 2400/42* (2013.01); *B60Y 2400/80* (2013.01); *B60Y 2410/10* (2013.01); *F16H 2037/0873* (2013.01); *F16H 2057/0203* (2013.01); *F16H 2057/02034* (2013.01); *F16H 2061/0046* (2013.01); *Y02T 10/6239* (2013.01); *Y02T 10/76* (2013.01); *Y10S 903/91* (2013.01); *Y10S 903/914* (2013.01); *Y10S 903/919* (2013.01); *Y10S 903/952* (2013.01)

(58) Field of Classification Search
CPC ..... F16H 2037/0873; F16H 2057/0203; F16H 2057/02034; F16H 2061/0046; F16H 37/0806; F16H 3/728; F16H 57/031; F16H 57/037; F16H 61/0265
See application file for complete search history.

(56) References Cited

U.S. PATENT DOCUMENTS

2009/0258747 A1* 10/2009 Iwase ...................... B60K 1/00
                                                                         475/150
2013/0090202 A1    4/2013  Hiraiwa
2016/0167504 A1*  6/2016  Kanada ................. B60K 6/387
                                                                         475/5

FOREIGN PATENT DOCUMENTS

| JP | 2008-120234 A | 5/2008 |
| JP | 2008-265598 A | 11/2008 |
| JP | 2008-265600 A | 11/2008 |

* cited by examiner

FIG. 4

| | | | CL1 | BK1 | MG1 | MG2 |
|---|---|---|---|---|---|---|
| EV | FORWARD / REVERSE | SINGLE MOTOR — ENGINE BRAKE NOT NECESSARY | | | G | M |
| | | SINGLE MOTOR — COMBINED WITH ENGINE BRAKE | △ | △ | G | M |
| | | TWO MOTORS | O | O | M | M |
| HV | FORWARD | HIGH | | O | G | M |
| | | LOW | O | | G | M |
| | REVERSE | LOW | O | | G | M |

HYBRID SYSTEM

CROSS-REFERENCE TO RELATED APPLICATIONS

This is a national phase application based on the PCT International Patent Application No. PCT/IB2014/001397 filed Jul. 28, 2014, claiming priority to Japanese Patent Application No. 2013-158184 filed Jul. 30, 2013, the entire contents of both of which are incorporated herein by reference.

BACKGROUND OF THE INVENTION

1. Field of the Invention

The invention relates to hybrid system of a hybrid vehicle that uses an engine and a rotary machine as power sources.

2. Description of Related Art

One such known hybrid system includes an engine, two rotary machines (e.g., electric motors), and a power split device (i.e., a planetary gear unit). In this hybrid system, a rotating shaft of the engine, rotating shafts of a first rotary machine and a second rotary machine and driving wheels, are connected to corresponding rotating elements of the power split device. For example, in a hybrid system described in Japanese Patent Application Publication No. 2008-120234 (JP 2008-120234 A) below, a planetary gear unit capable of operating as a speed change unit is arranged between the engine and the power split device. This speed change unit includes a rotating element that is connected to the rotating shaft of the engine, and a rotating element that is connected to a rotating element of the power split device. The rotating element of the power split device is a rotating element other than a rotating element that is connected to the rotating shaft of the first rotary machine and the rotating shaft of the second rotary machine, and the driving wheels. Moreover, the hybrid system described in JP 2008-120234 A is provided with an engagement device (i.e., a switching device) that changes speed ratios of the speed change device by switching the peed change device between a differential rotation possible state and a differential rotation not possible state. A hybrid system described in Japanese Patent Application Publication No. 2008-120234 (JP 2008-120234 A) and Japanese Patent Application Publication No. 2008-265600 (JP 2008-265600 A) is provided with a clutch (i.e., a fixed element) that fixes a rotating shaft of the engine. With this hybrid system, the vehicle is able to travel using the power of both the first rotary machine and the second rotary machine, by engaging this clutch and stopping the rotation of the rotating shaft of the engine. Therefore, in this hybrid system, the power source to be used for traveling is selected by controlling the engine, the first rotary machine, the second rotary machine, and the clutch, according to the required driving force. Also, with the hybrid system in JP 2008-265600 A, when traveling by the power of both the first rotary machine and the second rotary machine, the torque split of the first rotary machine and the second rotary machine is determined according to the efficiency of both the first rotary machine and the second rotary machine.

With a vehicle that employs a layout in which the engine is longitudinal mounted, such as a FR (Front-engine, Rear-wheel drive) vehicle, a power transmitting apparatus such as a transmission is covered by a floor tunnel below a floor panel. A floor tunnel is a tunnel portion of the body floor panel. Therefore, when a hybrid system having a structure such as that described in JP 2008-120234 A is mounted in this type of vehicle, a first rotary machine, a second rotary machine, a speed change device, a power split device, and an engagement device and the like are all arranged beneath this floor tunnel. Here, typically the floor tunnel becomes smaller in diameter toward the vehicle rear side, matching the shape of the case of the transmission. Therefore, when mounting this kind of hybrid system, it is desirable that the first rotary machine which, from among these, has a large diameter, be arranged toward the front of the vehicle in the floor tunnel. However, with this hybrid system, a hydraulically actuated engagement device has to be arranged farther toward the vehicle rear than the first rotary machine due to the arrangement of this first rotary machine, so the arrangement of an oil passage to supply hydraulic pressure to this engagement device is difficult.

SUMMARY OF THE INVENTION

The invention thus provides a hybrid system capable of supplying hydraulic pressure to an engagement device when a rotary machine is arranged toward a vehicle front side.

To achieve this, one aspect of the invention relates to a hybrid system that includes an engine; a rotary machine; a shift device that has an input shaft, the input shaft being connected to a rotating shaft of the engine; a differential device that has a plurality of differential rotating elements capable of differential rotation, the plurality of differential rotating elements including a first differential rotating element to which an output shaft of the shift device is connected, and a second differential rotating element to which a rotating shaft of the rotary machine is connected; a first engagement device configured to shift the shift device, the first engagement device being configured to be actuated by hydraulic pressure, the first engagement device including a first oil chamber, the rotary machine being arranged between the first engagement device and the engine; a case within which the rotary machine, the shift device, the differential device, and the first engagement device are housed, and the case is connected to the engine, and the case has an opening on the engine side; and a cover wall that covers the opening, operating oil being supplied to the first oil chamber via the cover wall.

The hybrid system according to the invention is able to supply operating oil to an engagement device for a speed change device via a cover wall interposed between an engine and a rotary machine, even if the rotary machine is arranged toward the engine, and the engagement device is arranged in a position farther away from the engine than the rotary machine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view of a clutch and brake operation chart of the hybrid system according to the invention;

DETAILED DESCRIPTION OF EMBODIMENTS

Hereinafter, example embodiments of the hybrid system according to the invention will be described in detail with reference to the accompanying drawings. The invention is not limited by these example embodiments.

The example embodiment of the hybrid system according to the invention will now be described with reference to FIGS. 1 to 10.

Figure 1:
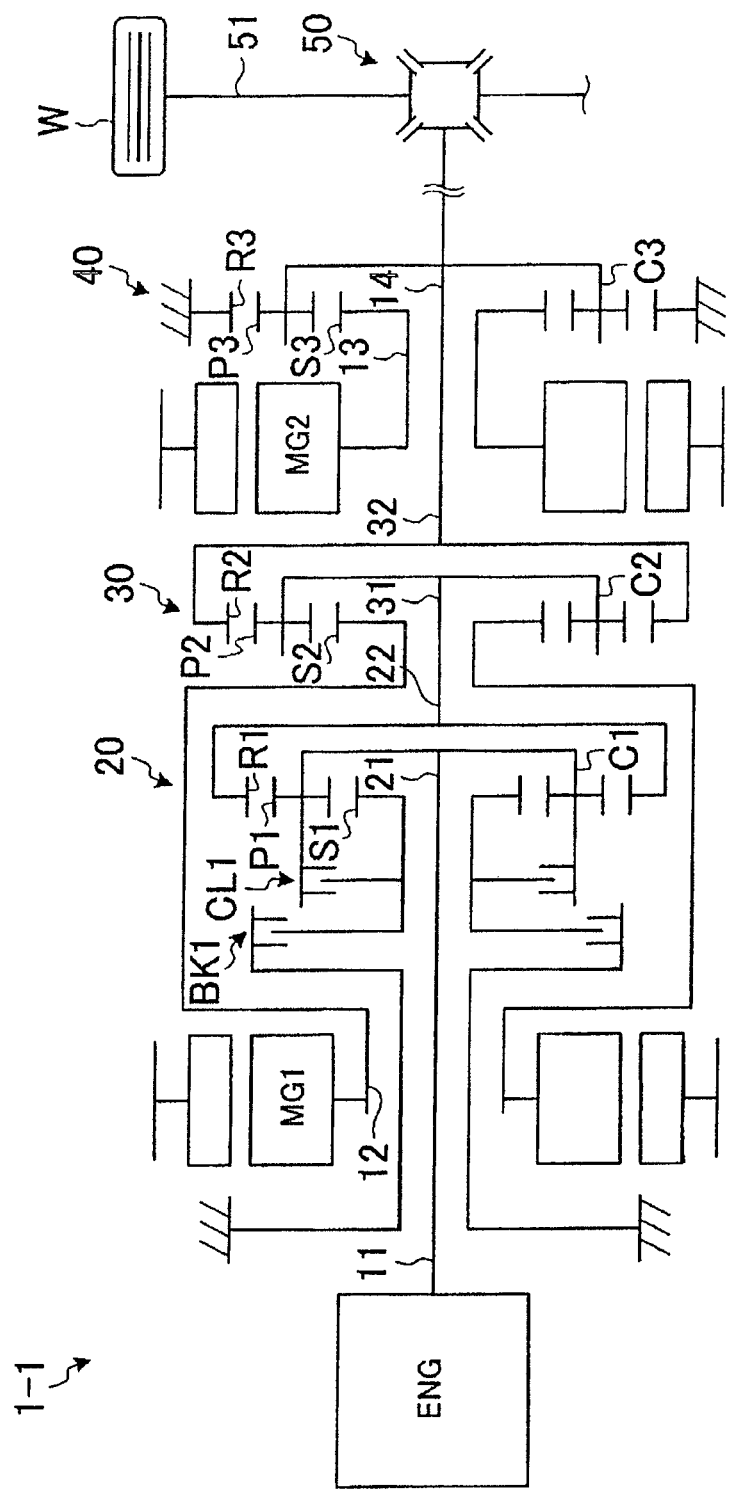
FIG. 1 is a skeleton view of the structure of one example embodiment of a hybrid system according to the invention.
Figure 2:
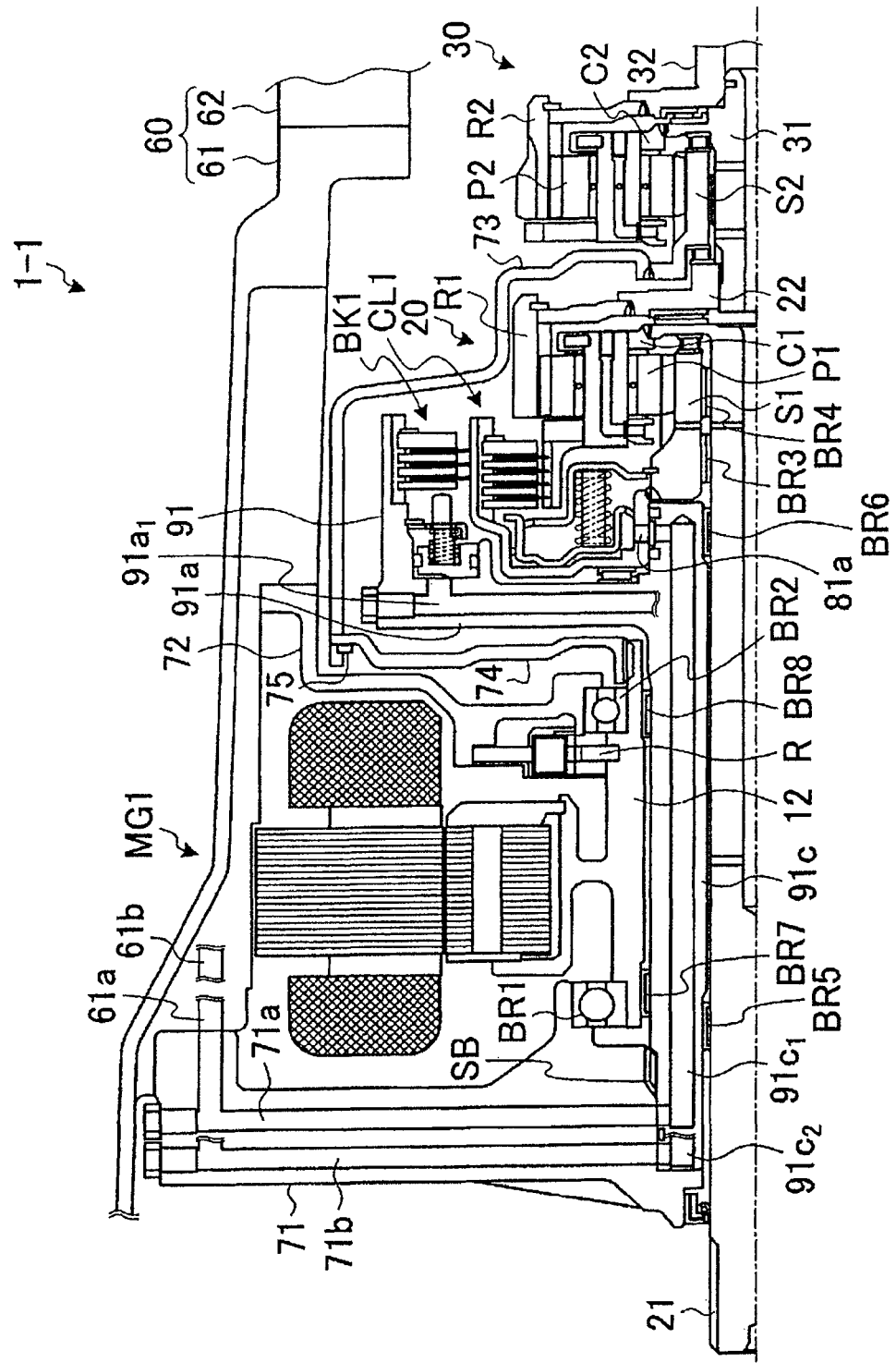
FIG. 2 is a sectional view of the structure of the inside of a case of the hybrid system of the example embodiment.

The hybrid system of this example embodiment is denoted by reference character 1-1 in FIGS. 1 and 2.

The hybrid system 1-1 includes an engine ENG, a first rotary machine MG1, and a second rotary machine MG2 as power sources. The first rotary machine MG1 and the second rotary machine MG2 are motor generator. In addition, the hybrid system 1-1 is provided with a power transmitting apparatus that is capable of transmitting power between these power sources, and is also capable of transmitting power between each of these power sources and a driving wheel W. This power transmitting apparatus includes a speed change device 20 and a differential device 30 that are connected together in series.

This hybrid system 1-1 is mounted in a vehicle that employs a layout in which the engine ENG is longitudinal mounted, such as a FR vehicle. Therefore, this hybrid system 1-1 is a uniaxial system in which an engine rotating shaft 11, a rotating shaft of the first rotary machine MG1 (hereinafter, referred to as "MG1 rotating shaft") 12, a rotating shaft of the second rotary machine MG2 (hereinafter, referred to as "MG2 rotating shaft") 13, a rotational axis center of the speed change device 20, and a rotational axis center of the differential device 30 are all arranged on the same axis. In this hybrid system 1-1, the engine ENG, the first rotary machine MG1, the speed change device 20, the differential device 30, and the second rotary machine MG2 are all arranged in order, from the vehicle front side, on the same axis. Although not shown in FIG. 2, the engine ENG is arranged on the left side of the paper on which FIG. 2 is drawn, and the second rotary machine MG2 is arranged on the right side of the paper on which FIG. 2 is drawn.

The engine ENG is an engine such as an internal combustion engine or an external combustion engine that outputs mechanical power (i.e., engine torque) from an engine rotating shaft 11. Operation of this engine ENG is controlled by an electronic control unit (hereinafter referred to as "engine ECU") 101.

The first rotary machine MG1 is a motor-generator that functions as both an electric motor and a generator, and generates output torque (hereinafter, referred to as "MG1 torque") that is outputs to the MG1 rotating shaft 12. The second rotary machine MG2 is similar, and generates output torque (hereinafter, referred to as "MG2 torque") that it outputs to the MG2 rotating shaft 13. Operation of these first and second rotary machines MG1 and MG2 is controlled by an electronic control unit (hereinafter, referred to as "MG ECU") 102 shown in FIG. 3.

The speed change device 20 has a first power transmitting element that transmits power to and from the engine ENG, and a second power transmitting element that transmits power to and from the differential device 30. This speed change device 20 is able to change the rate of the rotation input to one of these power transmitting elements, and transmit the rotation at the changed rate to the other power transmitting element.

The speed change device 20 described here includes a planetary gear unit. The planetary gear unit illustrated here is a single pinion planetary gear unit, and includes a sun gear S1, a ring gear R1, a plurality of pinion gears P1, and a carrier C1, as a plurality of rotating elements capable of differential rotation (hereinafter, referred to as "speed-changing rotating elements"). In this speed change device 20, one of the sun gear S1, the ring gear R1, and the carrier C1, is connected to the engine ENG, and one of the remaining two is connected to the differential device 30. In this example, the engine rotating shaft 11 and the carrier C1 are connected via a rotating shaft 21 so as to be able to rotate together as a unit. Therefore, here, the carrier C1 or the rotating shaft 21 of the carrier C1 is the first power transmitting element described above. Also in this example embodiment, the differential device 30 is connected to the ring gear R1 via a rotating shaft 22. The ring gear R1 or the rotating shaft 22 of the ring gear R1 is the second power transmitting element described above, and is connected to one of the differential rotating elements of the differential device 30 in a manner so as to be able to rotate together as a unit with this differential rotating element. This differential rotating element of the differential device 30 is a carrier C2 that will be described later.

The hybrid system 1-1 is provided with a shift control apparatus that operates (i.e., shifts) the speed change device 20. This shift control apparatus is used to change the speed ratio or speed of the speed change device 20. The shift control apparatus is also used to switch between a state in which power transmission is possible, and a neutral state that will be described later. More specifically, this shift control apparatus includes two engagement devices that adjust the stopped state or rotation state of a predetermined speed-changing rotating element in the speed change device 20. In this example, a clutch CL1 and a brake BK1 are provided as the engagement devices.

The clutch CL1 is a hydraulically actuated clutch apparatus that adjusts a connected/disconnected state between the sun gear S1 and the carrier C1. This clutch CL1 has a first engagement member that rotates together as a unit with the sun gear S1, and a second engagement member that rotates together as a unit with the carrier C1. This clutch CL1 is a friction engagement-type clutch that is placed in a released state, a partially-engaged stage, or a fully engaged state according to control by a HV ECU 100 that will be described later. In the released state, the first engagement member is disconnected from the second engagement member, such that the sun gear S1 and the carrier C1 are able to rotate relative one another, thus allowing differential rotation of the planetary gear unit in the speed change device 20. In the partially-engaged state, the first engagement member and the second engagement member are made to slip, such that relative rotation of the sun gear S1 and the carrier C1 is allowed within a range in which the first engagement member and the second engagement member do not rotate together as a unit. In the fully engaged state, the first engagement member and the second engagement member are locked together, such that the sun gear S1 and the carrier C1 are unable to rotate relative to one another, thus prohibiting differential rotation of the planetary gear unit in the speed change device 20. If the clutch CL1 is a mesh-type clutch (e.g., a dog clutch), it is controlled to either a released state or a fully engaged state.

The brake BK1 is a hydraulically actuated brake apparatus that restricts rotation of the sun gear S1. This brake BK1 has a first engagement member that rotates together as a unit with the sun gear S1, and a second engagement member that is fixed to a vehicle body. The vehicle body is, for example, a case of the power transmitting apparatus or the like. This brake BK1 is a friction engagement-type brake that is placed in a release state, a partially-engaged state, or a fully engaged state, according to control by the HV ECU 100. In the released state, the first engagement member is disconnected from the second engagement member, such that rotation of the sun gear S1 is allowed. In the partially-engaged state, the first engagement member and the second engagement member are made to slip, such that rotation of the sun gear S1 is allowed within a range in which the first engagement member and the second engagement member do not rotate together as a unit. In the fully engaged state, the first engagement member and the second engagement member are locked together, such that rotation of the sun gear S1 is prohibited. If the brake BK1 is a mesh-type brake, it is controlled to either a released state or a fully engaged state.

When both the clutch CL1 and the brake BK1 are in the released state, the speed change device 20 is in a neutral state in which power is unable to be transmitted between input and output. Between input and output refers to between the first power transmitting element and the second power transmitting element. In this neutral state, the transmission of power between the engine ENG and the differential device 30 is interrupted.

On the other hand, when one of the clutch CL1 and the brake BK1 in the speed change device 20 is engaged, power is able to be transmitted between input and output, so power is able to be transmitted between the engine ENG and the differential device 30.

For example, a case in which the clutch CL1 is released and the brake BK1 is fully engaged will be described. In this case, in the speed change device 20, differential rotation is performed with the sun gear S1 is held stationary (i.e., is in a rotation stopped state), such that the rate of the rotation of the engine ENG input to the carrier C1 is increased and rotation at this increased rate is output to the ring gear R1. That is, the speed change device 20 is placed in overdrive (OD) that has a speed ratio of less than 1. In contrast, a case in which the clutch CL1 is fully engaged and the brake BK1 is released will be described. In this case, in the speed change device 20, all of the speed-changing rotating elements rotate together as a unit, so differential rotation is prohibited. Input and output, i.e., the carrier C1 and the ring gear R1, are directly connected, so the rotation of the engine ENG input to the carrier C1 is output from the ring gear R1 at a constant speed. That is, the speed ratio in the speed change device 20 in this case is 1. In this way, the speed change device 20 is placed in a speed on the high speed side (i.e., a high speed) as a result of the clutch CL1 being released and the brake BK1 being fully engaged, and is placed in a speed on the low speed side (i.e., a low speed) as a result of the clutch CL1 being fully engaged and the brake BK1 being released. With this hybrid system 1-1, the speed ratio of the speed change device 20 is equal to or less than 1 in this way, so it is not absolutely necessary to obtain high torque from the first rotary machine MG1.

The differential device 30 includes a planetary gear unit. The planetary gear unit illustrated here is a single pinion planetary gear unit, and includes a sun gear S2, a ring gear R2, a plurality of pinion gears P2, and a carrier C2, as a plurality of rotating elements capable of differential rotation (hereinafter, referred to as "differential rotating elements"). In this differential device 30, the sun gear S2, the ring gear R2, and the carrier C2 can also be said to be power transmitting elements that transmit power to a connecting mate. One of the sun gear S2, the ring gear R2, and the carrier C2 is connected via the speed change device 20 to the engine ENG, one of the remaining two is connected to the first rotary machine MG1, and the last one is connected to the second rotary machine MG2 and the driving wheel W. In this example, the carrier C2 is connected to the ring gear R1 via a rotating shaft 31 of the carrier C2 and the rotating shaft 22 of the ring gear R1 of the speed change device 20. The sun gear S2 is connected to the MG1 rotating shaft 12 so as to be able to rotate together as a unit with this MG1 rotating shaft 12. The ring gear R2 is connected to the second rotary machine MG2 and the driving wheel W.

A planetary gear unit 40 that is on the same axis as the ring gear R2 and the second rotary machine MG2 is interposed between them. The planetary gear unit 40 illustrated here is a single pinion planetary gear unit that operates as a reduction mechanism, and includes a sun gear S3, a ring gear R3, a plurality of pinion gears P3, and a carrier C3, as a differential rotating elements. The sun gear S3 is connected to the MG2 rotating shaft 13 so as to rotate together as a unit with the MG2 rotating shaft 13. The ring gear R3 is fixed to a vehicle body. The vehicle body side is, for example, a case of the power transmitting apparatus or the like. The carrier C3 is connected via a rotating shaft 14 thereof to a rotating shaft 32 of the ring gear R2 of the differential device 30. The carrier C3 and the ring gear R2 of the differential device 30 rotate together as a unit. The rotating shaft 14 of the carrier C3 and the rotating shaft 32 of the ring gear R2 of the differential device 30 are connected to a drive shaft 51 and the driving wheel W via a differential gear unit 50.

This hybrid system 1-1 is provided with an oil pump, not shown, that supplies oil. This oil is used to cool and lubricate various parts in the power transmitting apparatuses such as the speed change device 20 and the differential device 30. This oil is also used as the operating oil (i.e., hydraulic fluid) of the clutch CL1 and the brake BK1.

In this power transmitting apparatus, the overall speed ratio, i.e., the system speed ratio of the hybrid system 1-1, is determined by the speed ratio of the speed change device 20 and the speed ratio of the differential device 30. This system speed ratio is the rotation speed ratio between the input and output in this power transmitting apparatus, and represents a ratio of the input side rotation speed to the output side rotation speed of this power transmitting apparatus, i.e., represents a reduction ratio. The output side rotation speed is the rotation speed of the ring gear R2 of the differential device 30. The input side rotation speed is the rotation speed of the carrier C1 of the speed change device 20. Therefore, the range of the speed ratio in this power transmitting apparatus is broader than the range of the speed ratio when only the differential device 30 serves as the transmission.

Figure 3:
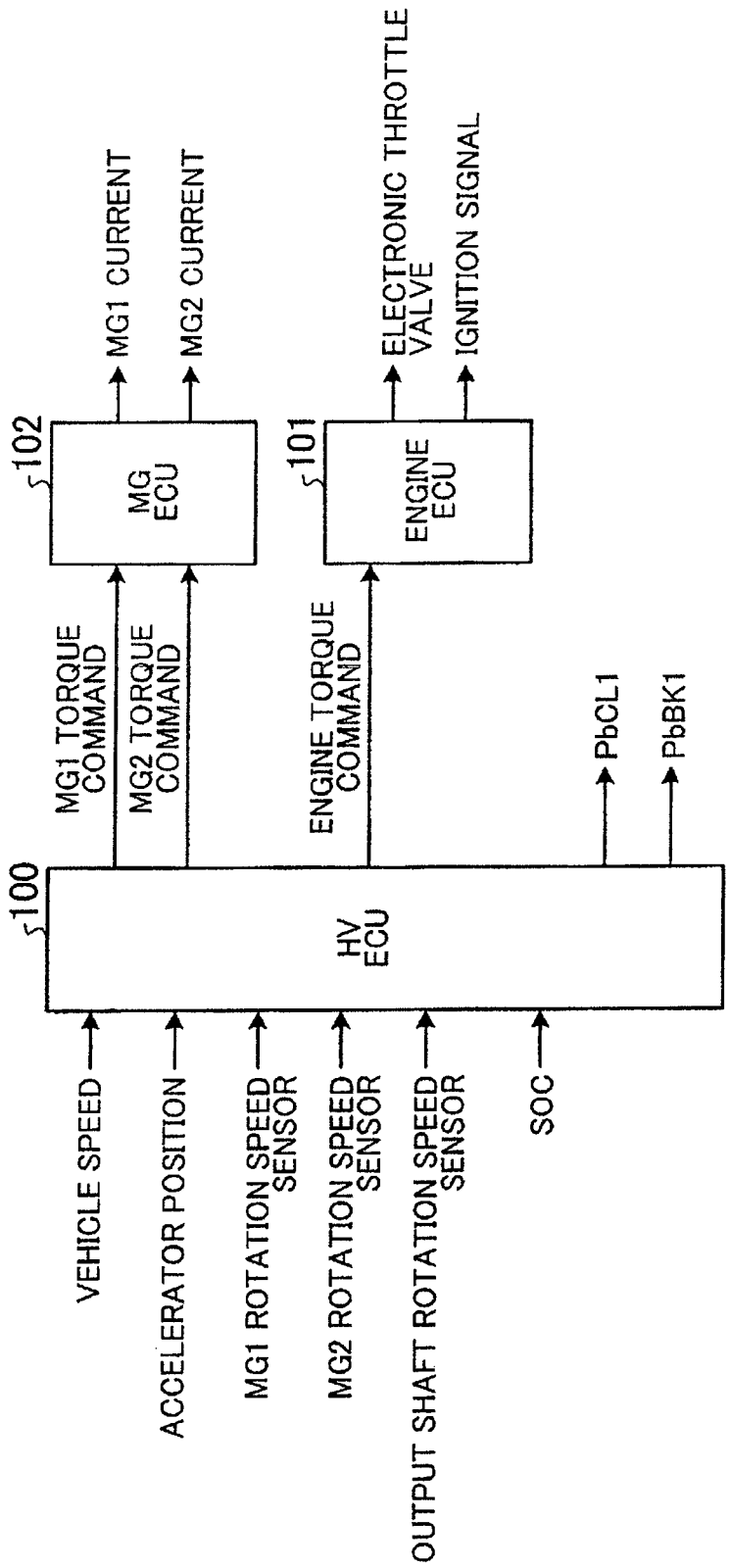
FIG. 3 is an input/output relationship diagram of the hybrid system according to the invention.

This hybrid system 1-1 is provided with an integrated ECU (hereinafter, referred to as "HV ECU") 100 that comprehensively controls the engine ECU 101 and the MG ECU 102, and performs integrated control on the system, as shown in FIG. 3. The control apparatus of this system is formed by these ECUs.

The HV ECU 100 is connected to various sensors, such as a vehicle speed sensor, an accelerator opening sensor, a MG1 rotation speed sensor, a MG2 rotation speed sensor, an output shaft rotation speed sensor, and a battery sensor. This HV ECU 100 obtains the vehicle speed, the accelerator opening, the rotation speed of the first rotary machine MG1 (i.e., the MG1 rotation speed), the rotation speed of the second rotary machine MG2 (i.e., the MG2 rotation speed), the rotation speed of an output shaft of a power transmitting apparatus, and the SOC (State-Of-Charge) of a secondary battery and the like, from these various sensors. The outputs shaft of the power transmitting apparatus is the output shaft of the ring gear R2 of the differential device 30, for example.

The HV ECU 100 calculates a required vehicle driving force, a required power, and a required torque and the like of the hybrid vehicle, based on the obtained information. Based on this, the HV ECU 100 calculates a required engine torque, a required MG1 torque, and a required MG2 torque, and outputs output control commands to the engine ECU 101 and the MG ECU 102.

The HV ECU 100 also outputs a command value (PbCL1) for the hydraulic pressure to be supplied to the clutch CL1, and a command value (PbBK1) for the hydraulic pressure to be supplied to the brake BK1, to a hydraulic pressure regulating apparatus, not shown. The hydraulic pressure regulating apparatus executes an engagement operation or a release operation of the clutch CL1 and the brake BK1 according to these command values.

In this hybrid system 1-1, an electric vehicle (EV) traveling mode and a hybrid (HV) traveling mode are set. The EV traveling mode is a traveling mode according to which the vehicle travels using the power of at least one of the first and second rotary machines MG1 and MG2. The HV traveling mode is a traveling mode according to which the vehicle travels using only the power of the engine ENG, or using the power of the second rotary machine MG2 in addition to the power of the engine ENG.

FIG. 4 is a view of a clutch and brake operation chart of the hybrid system 1-1 in each traveling mode. In the column of the clutch CL1 and the column of the brake BK1 in this clutch and brake operation chart, a circle indicates a fully engaged state, and a blank space indicates a released state. Also, a triangle indicates that the brake BK1 is in the released state if the clutch CL1 is in the fully engaged state, and the brake BK1 is in the fully engaged state if the clutch CL1 is in the released state. In the column of the first rotary machine MG1 and the column of the second rotary machine MG2 in this clutch and brake operation chart, "G" indicates that the operating state is mainly that of a generator, and "M" indicates that the operating state is mainly that of an electric motor.

The EV traveling mode is divided into a single motor EV mode in which only the second rotary machine MG2 is the power source, and a double motor EV mode in which both the first and second rotary machines MG1 and MG2 are the power source. The single motor EV mode is selected when operating at a low load, and the double motor EV mode is selected when operating at a higher load.

Figure 5:
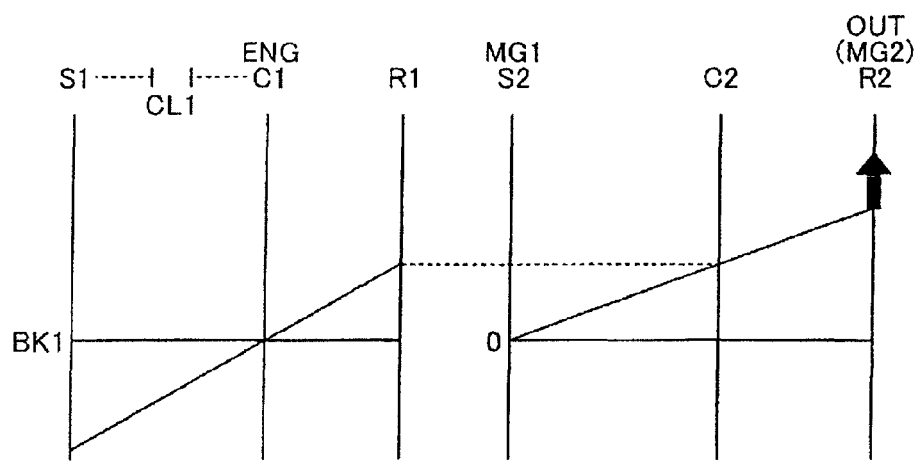
FIG. 5 is an alignment graph according to a single motor EV mode.

When the secondary battery is able to be charged, power consumption by the engine brake is not absolutely necessary. Therefore, in the single motor EV mode in this case, both the clutch CL1 and the brake BK1 are released, such that the speed change device 20 is placed in the neutral state. When traveling forward, the HV ECU 100 outputs positive MG2 torque according to the required vehicle driving force to the second rotary machine MG2. At this time, the second rotary machine MG2 operates in a forward (i.e., positive) direction. The forward direction is a rotational direction of the MG2 rotating shaft 13 and the ring gear R2 of the differential device 30 when traveling forward (i.e., when the vehicle is traveling forward). FIG. 5 is an alignment graph when traveling forward. On the other hand, when the traveling in reverse (i.e., when the vehicle is traveling in reverse), the HV ECU 100 outputs negative MG2 torque according to the required vehicle driving force to the second rotary machine MG2. At this time, the second rotary machine MG2 operates in a reverse (i.e., negative) direction.

When in this EV traveling mode, the ring gear R1 of the speed change device 20 is dragged along (i.e., rotated), but because the speed change device 20 is in the neutral state, the engine ENG is not dragged along. Therefore, when in this EV traveling mode, a large amount of regenerative power is able to be obtained from the first rotary machine MG1. Furthermore, here, the vehicle is able to be travel with the engine ENG stopped, and dragging loss of the engine ENG will not occur, so fuel and power consumption are able to be improved.

Here, with this single motor EV mode, it is preferable to reduce the drag loss of the first rotary machine MG1 that accompanies the differential rotation of the differential device 30. More specifically, the HV ECU 100 is able to reduce drag loss of the first rotary machine MG1 by applying slight torque to the first rotary machine MG1 to generate power, and feedback-controlling the MG1 rotation speed thereof to be 0. Also, when the rotation speed of the first rotary machine MG1 is able to be kept at 0 without applying torque to the first rotary machine MG1, drag torque of the first rotary machine MG1 may be reduced without applying torque to the first rotary machine MG1. Also, in order to reduce the drag loss of the first rotary machine MG1, the rotation speed of the first rotary machine MG1 may be made 0 using a d-axis lock or cogging torque of the first rotary machine MG1. A d-axis lock refers to controlling the rotation speed of the first rotary machine MG1 to 0 by supplying current that generates a magnetic field that will hold the rotor stationary from an inverter to the first rotary machine MG1.

Also, when charging of the secondary battery is prohibited, the vehicle need simply be made to travel in the single motor EV mode combined with the engine brake to discharge the secondary battery. In this case, engine brake is generated by dragging the engine ENG, which is achieved by engaging only one of the clutch CL1 and the brake BK1, as shown in FIG. 4. At this time, the HV ECU 100 increases the engine speed by controlling the first rotary machine MG1.

Figure 6:
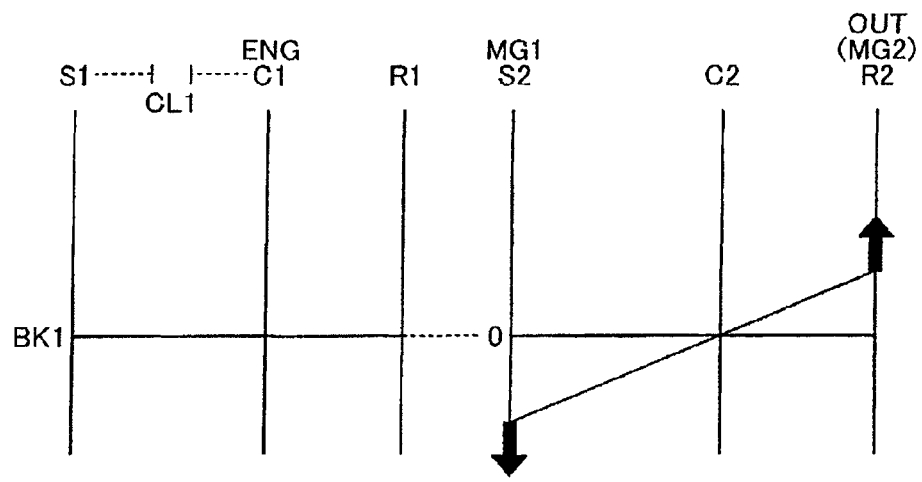
FIG. 6 is an alignment graph according to a double motor EV mode.

In the double motor EV mode, the HV ECU 100 fully engages both the clutch CL1 and the brake BK1, thus stopping all of the speed-changing rotating elements of the speed change device 20. As a result, the rotation speed of the engine ENG becomes 0, and the carrier C2 of the differential device 30 is locked at a rotation speed of 0. FIG. 6 is an alignment graph at this time.

The HV ECU 100 outputs the MG1 torque and the MG2 torque according to the required vehicle driving force. At this time, the carrier C2 is prohibited from rotating, and is thus able to receive the reaction force from the MG1 torque. Therefore, when traveling forward, positive rotation torque is able to be output from the ring gear R2 by outputting negative MG1 torque with negative rotation to the first rotary machine MG1. On the other hand, when traveling in reverse, negative rotation torque is able to be output from the ring gear R2 by outputting positive MG1 torque with positive rotation to the first rotary machine MG1.

Figure 7:
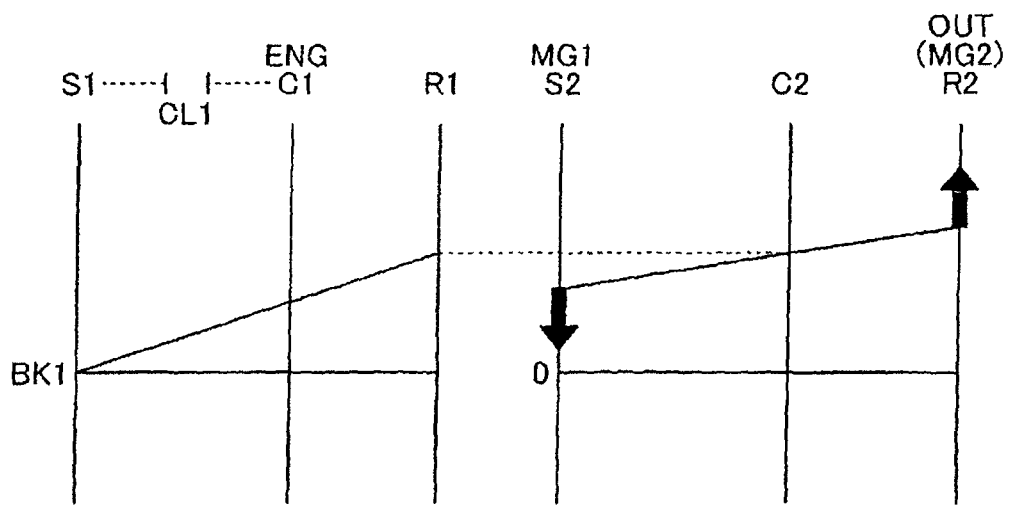
FIG. 7 is an alignment graph according to an HV high mode.
Figure 8:
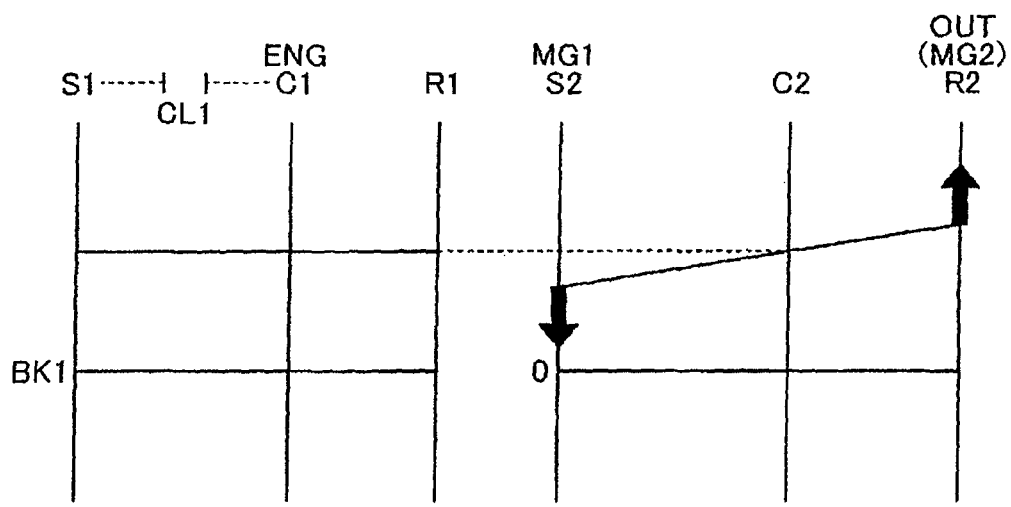
FIG. 8 is an alignment graph according to an HV low mode.

In the HV traveling mode, the vehicle travels by only engine torque or both engine torque and MG2 torque, while receiving reaction force with the first rotary machine MG1. The engine torque transmitted to the drive shaft 51 at this time is so-called engine-direct torque, and is mechanically transmitted from the engine ENG to the drive shaft 51 without going through an electrical path. This HV traveling mode is divided into a traveling mode when the speed change device 20 is in a high speed (hereinafter, referred to as "HV high mode"), and a traveling mode when the speed change device 20 is in a low speed (hereinafter, referred to as "HV low mode"). FIG. 7 is an alignment graph of the HV high mode. Also, FIG. 8 is an alignment graph of the HV low mode. In the HV traveling mode, basically the differential device 30 is in a state in which it is able to perform differential rotation, and the speed of the speed change device 20 is changed by controlling the state (i.e., the engaged state or the released state) of the clutch CL1 and the brake BK1.

The HV ECU 100 controls the traveling mode to the HV high mode by releasing the clutch CL1 and fully engaging the brake BK1. On the other hand, the HV ECU 100 controls the traveling mode to the HV low mode by fully engaging the clutch CL1 and releasing the brake BK1.

When traveling in reverse, the HV low mode is used. When traveling in reverse, the first rotary machine MG1 operates as a generator and the second rotary machine MG2 operates as an electric motor. This second rotary machine MG2 rotates in the opposite direction when traveling forward.

The HV ECU 100 executes cooperative shift control that simultaneously shifts the speed change device 20 and the differential device 30, when performing a switch between the HV high mode and the HV low mode. In this cooperative shift control, the HV ECU 100 increases the speed ratio of one of the speed change device 20 and the differential device 30, and reduces the speed ratio of the other. A speed shifting system of the entire system is formed by the speed change device 20, the differential device 30, the first rotary machine MG1, the clutch CL1, and the brake BK1 in this hybrid system 1-1. Therefore, these structures are able to be operated as an electric continuously variable transmission in which the system speed ratio is able to be continuously (i.e., steplessly) changed by electrically controlling the rotation of the first rotary machine MG1. When regenerating power, mainly the second rotary machine MG2 is used.

More specifically, when switching from the HV high mode to the HV low mode, the HV ECU 100 changes the speed ratio of the differential device 30 to the high gear side in synchronization with shifting the speed change device 20 to a low gear, such that the system speed ratio stays constant throughout the switching process. In contrast, when switching from the HV low mode to the HV high mode, the HV ECU 100 changes the speed ratio of the differential device 30 to the low gear side in synchronization with shifting the speed change device 20 to a high gear, such that the system speed ratio stays constant throughout the switching process. In this way, in this hybrid system 1-1, a discontinuous change of the system speed ratio is inhibited or reduced, so the adjustment amount of the engine speed that accompanies a shift is reduced, or an adjustment of the engine speed that accompanies a shift is not necessary.

After a switch to the HV low mode, the HV ECU 100 changes the system speed ratio continuously (i.e., steplessly) to the low gear side, by speed ratio control of the differential device 30, for example. On the other hand, after a switch to the HV high mode, the HV ECU 100 changes the system speed ratio continuously (i.e., steplessly) to the high gear side, by speed ratio control of the differential device 30, for example. This speed ratio control of the differential device 30 is performed by controlling the first rotary machine MG1 or the second rotary machine MG2, for example. In this hybrid system 1-1, a shifting system of the entire system is formed by the speed change device 20, the differential device 30, the first rotary machine MG1, the clutch CL1, and the brake BK1. Therefore, these structures are able to be operated as an electric continuously variable transmission in which the system speed ratio is able to be continuously (i.e., steplessly) changed by electrically controlling the rotation of the first rotary machine MG1.

Figure 9:
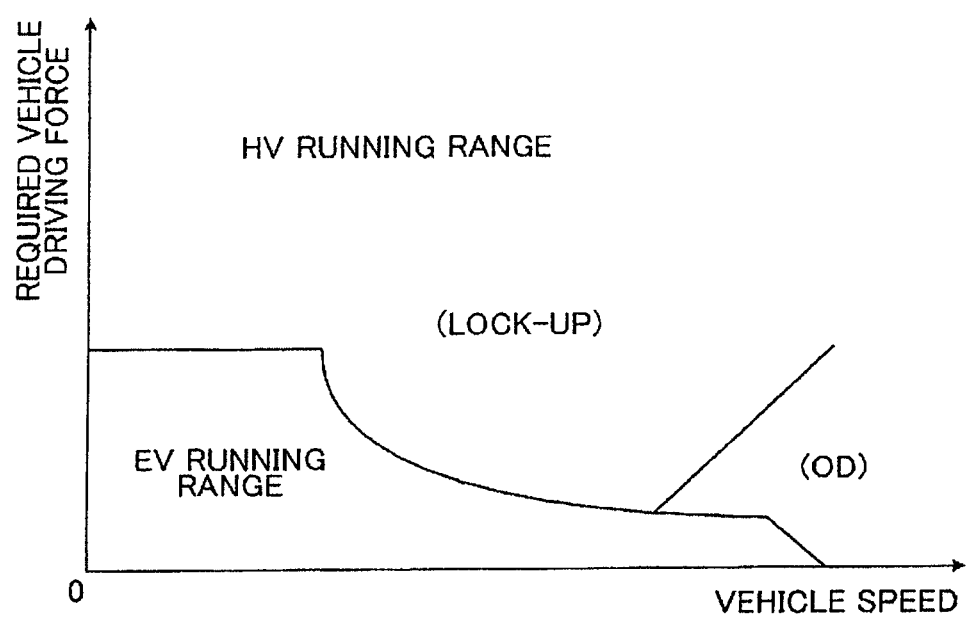
FIG. 9 is a view illustrating an EV traveling range and an HV traveling range.

Here, FIG. 9 is a view of an example of a corresponding relationship of the vehicle speed, the required vehicle driving force, and the traveling mode. With this hybrid system 1-1, EV traveling is performed when the required vehicle driving force is for a low load. However, this EV traveling range becomes narrower as the vehicle speed becomes higher than a given speed, according to the output characteristics of the first rotary machine MG1 and the second rotary machine MG2. When the required vehicle driving force is for a low load and the vehicle speed is high, fuel economy is improved by HV traveling that controls the speed change device 20 to the overdrive state (i.e., a high speed). In the remaining range, HV traveling is used by controlling the speed change device 20 to a directly connected state (i.e., a low speed). The remaining range is when the required vehicle driving force is for a middle load and a high load, regardless of the vehicle speed, and when the required vehicle driving force is for a low load and the vehicle speed is medium. Also, the speed change device 20 is controlled to the directly connected state as the vehicle speed decreases, even if the required vehicle driving force is for a low load and the vehicle speed is high. EV traveling is give priority over HV traveling when the SOC of the secondary battery is large enough for the battery to be able to be discharged.

In this way, when performing HV traveling, the HV high mode that allows for a decrease in the power environment is selected when the vehicle is traveling at a high vehicle speed, and the HV low mode is selected when traveling at a medium or low vehicle speed that is lower than that. With this hybrid system 1-1, the system speed ratio has two mechanical points (i.e., system speed ratio γ1 system speed ratio γ2) that are on the high gear side of 1. Therefore, in the HV traveling mode, transmission efficiency when operating in a high gear is able to be improved, so fuel economy when traveling at a high vehicle speed is able to be improved.

The HV ECU 100 starts the stopped engine ENG when there is a switch from the EV traveling mode to the HV traveling mode. When the current EV traveling mode is the single motor EV mode that does not require an engine brake, the HV ECU 100 shifts into a target speed according to the HV traveling mode (i.e., the HV high mode or the HV low mode) after the speed change device 20 in the neutral state is switched. Also, when the current EV traveling mode is the single motor EV mode with the engine brake, and the current speed (i.e., a high speed or a low speed) of the speed change device 20 is different from a target speed according to the HV traveling mode after the switch, the HV ECU 100 shifts the speed change device 20 to this target speed. Also, when the current EV traveling mode is the double motor EV mode, the HV ECU 100 shifts the speed change device 20 that is in the directly connected state to a target speed according to the HV traveling mode after the switch. When starting the engine ENG, the rotation speed of the engine ENG is increased by the first rotary machine MG1 to achieve ignition. At this time, the MG2 torque to which cancel torque for the reaction force received by the first rotary machine MG1 has been added is output to the second rotary machine MG2.

This hybrid system 1-1 is largely divided into the engine ENG and structure other than the engine ENG. The structure other than the engine ENG is placed in a case 60 (FIG. 2). This case 60 includes a housing 61 and an main case 62. The housing 61 is fastened by a bolt to a rear end of the engine ENG, and the main case 62 is fastened by a bolt to the housing 61. In this hybrid system 1-1, the entire engine ENG, or most of the engine ENG with the exception of a rear end portion thereof, is placed in an engine compartment, and the case 60, i.e., the structure other than the engine ENG, is arranged below a floor tunnel on the vehicle rear side relative to the engine compartment.

Hereinafter, the arrangement inside the case 60 of the hybrid system 1-1, i.e., the arrangement of the structure other than the engine ENG, will be described in detail with reference to FIG. 2. Below, unless otherwise specifically stated, a direction along the axial center of the hybrid system 1-1 will be referred to as the "axial direction", and a direction around this axis will be referred to as the "circumferential direction". The axial center is the rotational center of the engine rotating shaft 11 and the MG1 rotating shaft 12 and the like. Also, a direction orthogonal to this axial center will be referred to as the "radial direction", and in this radial direction, a side toward the inside will be referred to as the "radially inner side" or "radially inside", and a side toward the outside will be referred to as the "radially outer side" or "radially outside".

In the structure other than the engine ENG, the first rotary machine MG1 is the structure with the largest outside diameter. Therefore, the first rotary machine MG1 is preferably arranged on the vehicle front side, i.e., the engine ENG side, that has the largest diameter in the floor tunnel. That is, this first rotary machine MG1 is preferably arranged in the case 60, near the engine ENG. This first rotary machine MG1 is arranged on the vehicle front side in the case 60, as shown in FIG. 2. Also, as described above, the speed change device 20 and the differential device 30 are arranged in positions farther from the engine ENG than the first rotary machine MG1 is, i.e., on the vehicle rear side of the first rotary machine MG1. Therefore, in this hybrid system 1-1, the clutch CL1 and the brake BK1 that operate the speed change device 20 are also arranged on the vehicle rear side of than first rotary machine MG1.

More specifically, the engine ENG, the first rotary machine MG1, the clutch CL1 and the brake BK1, the speed change device 20, the differential device 30, and the second rotary machine MG2 are arranged on the same axis in this order from the vehicle front side. The first rotary machine MG1, the clutch CL1, the brake BK1, the speed change device 20, and the differential device 30 are placed in the housing 61. Also, the second rotary machine MG2 and the planetary gear unit 40 are placed in the main case 62.

The opening of the housing 61 on the engine ENG side, i.e., the opening provided on the engine ENG side of the case 60, is covered by a disk-like cover wall 71 that is concentric with the engine ENG and the first rotary machine MG1. On the other hand, a concentric disk-like partition wall 72 is provided between the first rotary machine MG1, and the clutch CL1 and the brake BK1, in the housing 61. Therefore, the inside of the housing 61 is divided into a housing space for the first rotary machine MG1 that is surrounded by the cover wall 71 and the partition wall 72, and a housing space in which the clutch CL1, the brake BK1, the speed change device 20, and the differential device 30 that are on the vehicle rear side of the partition wall 72 are housed.

In the first rotary machine MG1, an inner race of each of two annular bearings BR1 and BR2 are fit into an outer peripheral surface of a rotor that is also the MG1 rotating shaft 12. Meanwhile, an outer race of the bearing BR1 is fit into a radially inside portion of the cover wall 71. Also, the outer race of the bearing BR2 is fit into a radially inside portion of the partition wall 72. Here, the cover wall 71 and the partition wall 72 are fixed to the housing 61 at radially outside portions, and do not rotate in the circumferential direction. Therefore, the rotor of the first rotary machine MG1 is able to rotate in the circumferential direction inside the housing 61. This rotation is detected by a resolver R that serves as the MG1 rotation speed sensor.

The rotating shaft 21 of the carrier C1 that is also the input shaft of the speed change device 20 is arranged on the radial inner side of the sun gear S1, and is fixed to the clutch CL1 on the vehicle rear side (i.e., the driving wheel W side) of the speed change device 20. In this speed change device 20, annular bearings BR3 and 8R4 are interposed between an outer peripheral surface of the rotating shaft 21 and an inner peripheral surface of the sun gear S1, and allow relative rotation in the circumferential direction between the two. The rotating shaft 21 extends in the axial direction toward the engine ENG side, and is connected to the engine rotating shaft 11 side via a damper limiter, not shown, at a tip that has passed through the cover wall 71. Therefore, this rotating shaft 21 is also on the radially inner side of the first rotary machine MG1.

Meanwhile, the rotating shaft 22 of the ring gear R1 that is also the output shaft of the speed change device 20 is a disk-like member that is provide to the vehicle rear side of the fixed portion of the carrier C1 and the rotating shaft 21. This rotating shaft 22 has a hole provided in an axial center portion thereof. An outer peripheral surface of a rotating shaft 31 of the carrier C2 in the differential device 30 is spline-engaged with an inner peripheral surface formed by this hole. The rotating shaft 31 of the carrier C2 is an input shaft of the differential device 30. The rotating shaft 32 of the ring gear R2 corresponds to an output shaft of the differential device 30.

Also, the sun gear S2 of the differential device 30 is connected to the MG1 rotating shaft 12, i.e., the rotor, as described above, and rotates together as a unit with this MG1 rotating shaft 12. The sun gear S2 and the MG1 rotating shaft 12 are connected together via first and second connecting members 73 and 74. These first and second connecting members 73 and 74 are arranged to the vehicle rear side of the partition wall 72.

The first connecting member 73 is a cylindrical member that is open on the vehicle front and rear sides, and is concentric with the differential device 30 and the like. The opening on the vehicle rear side is closed off by the differential device 30. The clutch CL1, the brake BK1, and the speed change device 20 are housed inside this first connecting member 73. That is, this first connecting member 73 is arranged on the radially outer side of the clutch CL1, the brake BK1, and the speed change device 20. This first connecting member 73 is arranged farther toward the vehicle front side than the differential device 30, and is fixed at a radially inside portion thereof on the vehicle rear side to the sun gear S2 by welding or the like. Therefore, the rotating shaft 31 of the carrier C2 extends to the inside the first connecting member 73.

The second connecting member 74 is a disk-like member that blocks off the opening on the vehicle front side of the first connecting member 73. This second connecting member 74 is fixed to the first connecting member 73 by being inserted inside the first connecting member 73, and arranging a snap ring 75 to a radially outside portion thereof. Meanwhile, the radially inside portion of the second connecting member 74 is spline-engaged with the outer peripheral surface of the MG1 rotating shaft 12.

Figure 10:
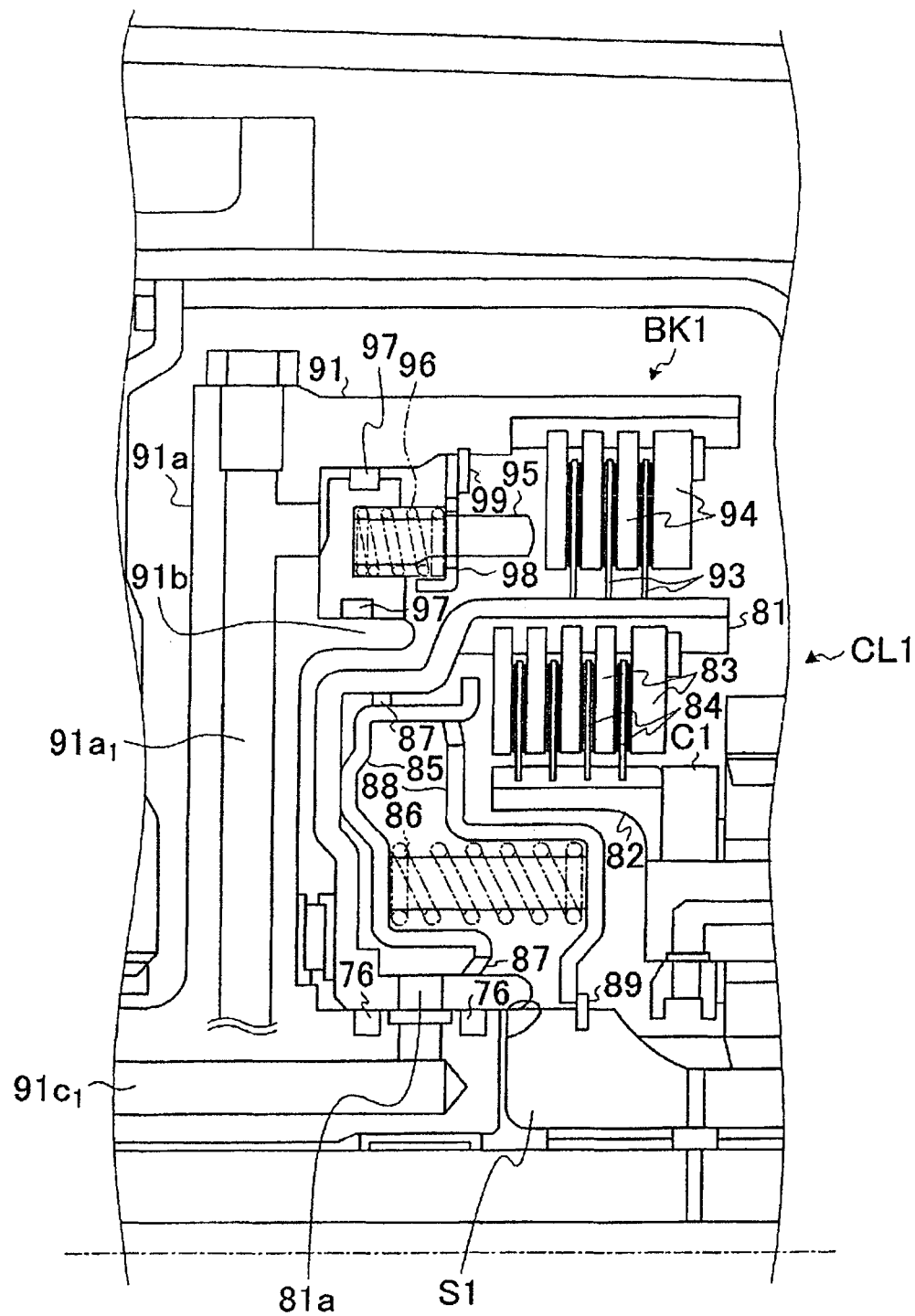
FIG. 10 is an enlarged view of a clutch and a brake in FIG. 2.

The clutch CL1 is a multiple disc clutch apparatus, and includes a cylinder member 81, a hub member 82, a plurality of first plates 83, a plurality of second plates 84, a piston member 85, and elastic members 86 (FIG. 10). The second plates 84 are friction plates.

The cylinder member 81 is a member that has an annular space concentric with the speed change device 20 and the like, and is arranged farther to the vehicle front side than the speed change device 20. This annular space is closed off by a wall surface on the vehicle front side, and is open on the vehicle rear side. This cylinder member 81 is fixed at a radially inside portion to the sun gear S1 of the speed change device 20 by welding or the like. The plurality of annular first plates 83 are arranged spaced apart in the axial direction, on an inner peripheral surface of a radially outside portion of the cylinder member 81. These first plates 83 correspond to the first engagement member described above.

The hub member 82 is an annular member that is concentric with the speed change device 20 and the like. This hub member 82 is arranged inside the cylinder member 81, with an outer peripheral surface opposing an inner peripheral surface of a radially outside portion of the cylinder member 81. The plurality of second plates 84 are arranged spaced apart in the axial direction, on the outer peripheral surface of the hub member 82. These second plates 84 correspond to the second engagement member described above, and are provided with friction material on each annular surface in the axial direction. These second plates 84 are arranged between adjacent first plates 83. This hub member 82 is fixed to the carrier C1 of the speed change device 20.

The piston member 85 is a member that is arranged in a state able to move back and forth in the axial direction with respect to the cylinder member 81, inside the cylinder member 81. This piston member 85 is a member formed in a same shape as the cylinder member 81, and has an annular space. This annular space is closed off by a wall surface on the vehicle front side. An annular seal member 87 is arranged on both a radially outside portion and a radially inside portion, between the piston member 85 and the cylinder member 81. The annular seal member is an O-ring, for example. Therefore, an annular, extremely liquid-tight oil chamber is formed between the piston member 85 and the cylinder member 81.

Operating oil for the clutch CL1 is supplied to this oil chamber. When the operating oil is supplied to this oil chamber and the hydraulic pressure rises, the piston member 85 moves toward the vehicle rear side and applies pressure to the first plates 83 at a radially outside portion. As a result, the clutch CL1 is placed in an engaged state in this case. On the other hand, when the hydraulic pressure in the oil chamber is reduced, the clutch CL1 is placed in a released state. In order to create this released state, a plurality of elastic members 86 are arranged spaced apart in the circumferential direction, in the annular space inside the piston member 85. These elastic members 86 generate spring force in advance in the released state, and are compressed as the piston member 85 moves in the direction in which the clutch CL1 engages. These elastic members 86 push the piston member 85 back toward the vehicle front side with the spring force generated from their compression, when hydraulic pressure in the oil chamber is reduced. Therefore, in this clutch CL1, one end of each elastic member 86 is retained by the piston member 85, and the other end is retained by a retaining member 88. This retaining member 88 is arranged covering the annular opening of the piston member 85. Movement of the retaining member 88 in the axial direction is regulated by the elastic members 86, and a snap ring 89 provided on the sun gear S1.

The brake BK1 is a multiple disc brake apparatus. In this example, the cylinder member 81 of the clutch CL1 is also used as a hub member of the brake BK1. This brake BK1 includes a cylinder member 91, a hub member that is shared with the cylinder member 81 of the clutch CL1, a plurality of first plates 93, a plurality of second plates 94, a piston member 95, and elastic members 96 (FIG. 10).

The cylinder member 91 is a member that has an annular space concentric with the speed change device 20 and the like, and is arranged farther to the vehicle front side than the speed change device 20. This annular space is closed off by a disk-like wall portion 91a on the vehicle front side, and is open on the vehicle rear side. The clutch CL1 is arranged in this space. The plurality of first plates 93 are arranged space apart in the axial direction, on an outer peripheral surface of the cylinder member 81 of the clutch CL1. These first plates 93 correspond to the first engagement member described above, and are provided with friction material on each annular surface in the axial direction. The outer peripheral surface of the cylinder member 81 opposes the inner peripheral surface of the radially outside portion of the cylinder member 91 that forms the annular space. The plurality of annular second plates 94 are arranged spaced apart in the axial direction on an inner peripheral surface of a radially outside portion thereof. The first plates 93 are arranged between adjacent second plates 94. In this way, the brake BK1 is arranged on the radially outer side of the clutch CL1.

The piston member 95 is an annular member that is arranged in a state able to moving back and forth in the axial direction with respect to the cylinder member 91, on a radially outside portion of the inside the cylinder member 91. An annular seal member 97 is arranged between this piston member 95 and the radially outside portion of the cylinder member 91. This piston member 95 includes, on the inside thereof, a retaining portion 91b that supports the piston member 95 from the radially inner side. This retaining portion 91b is an annular portion that extends from a wall portion 91a toward the vehicle rear side. In this brake BK1, an annular seal member 97 is also arranged between this retaining portion 91*b* and the piston member 95. Therefore, an annular, extremely liquid-tight oil chamber is formed between the piston member 95 and the cylinder member 91.

Operating oil for the brake BK1 is supplied to this oil chamber. When the operating oil is supplied to this oil chamber and the hydraulic pressure rises, the piston member 95 moves toward the vehicle rear side and applies pressure to the second plates 94. As a result, the brake BK1 is placed in an engaged state in this case. On the other hand, when the hydraulic pressure in the oil chamber is reduced, the brake BK1 is placed in a released state. In order to create this released state, a plurality of elastic members 96 are arranged spaced apart in the circumferential direction, between the piston member 95 and a retaining member 98. These elastic members 96 are retained at one end by the piston member 95, and are retained at the other end by the retaining member 98. This retaining member 98 is an annular member that is arranged between the piston member 95 and the second plates 94. The elastic members 96 generate spring force in advance in the released state, and are compressed as the piston member 95 moves in the direction in which the brake BK1 engages. These elastic members 96 push the piston member 95 back toward the vehicle front side with the spring force generated from their compression, when hydraulic pressure in the oil chamber is reduced. Movement of the retaining member 98 in the axial direction is regulated by the elastic members 96, and a snap ring 99 provided on a radially outside portion of the cylinder member 91.

Here, the oil passages of the operating oil of the clutch CL1 and the brake BK1 will be described.

This operating oil is pressure-fed by an oil pump and sent to the vehicle front side via oil passages 61*a* and 61*b* formed inside the wall surface of the housing 61 (FIG. 2). The oil passage 61*a* is an oil passage for the clutch CL1, while the oil passage 61*b* is an oil passage for the brake BK1. The oil passages 61*a* and 61*b* are formed isolated from each other by a phase difference in the circumferential direction.

The oil passage 61*a* for the clutch CL1 is communicated with an oil passage 71*a* for the clutch CL1 that is formed inside of a wall surface of the cover wall 71. Also, the oil passage 61*b* for the brake BK1 is communicated with an oil passage 71*b* for the brake BK1 that is formed inside of a wall surface of the cover wall 71. These oil passages 71*a* and 71*b* of the cover wall 71 each have an oil passage that extends in the radial direction, and are formed isolated from each other by a phase difference in the circumferential direction. Also, in this example, the oil passages 71*a* and 71*b* are arranged also offset in the axial direction. These oil passages 71*a* and 71*b* are communicated at radially outside portions to the oil passages 61*a* and 61*b* of the housing 61.

Operating oil is supplied from the oil passages 71*a* and 71*b* arranged in the cover wall 71, to the clutch CL1 and the brake BK1. However, the first rotary machine MG1 is between the clutch CL1 and the brake BK1, and the oil passages 71*a* and 71*b*. Therefore, in this hybrid system 1-1, oil passages are provided connecting these together. In order to provide these oil passages, a cylindrical portion 91*c* that extends in the axial direction from a radially inside portion of the wall portion 91*a* toward the vehicle front side is provided in the cylinder member 91.

This cylindrical portion 91*c* extends to the radial inside of the cover wall 71. The cylindrical portion 91*c* and the cover wall 71 are connected by a spline bearing SB. Therefore, the cylinder member 91 is prohibited from rotating in the circumferential direction with respect to the case 60. However, the spline bearing SB is formed so that the cover wall 71 is able to be easily assembled to the cylindrical portion 91*c*. The cylindrical portion 91*c* is concentric with the rotating shaft 21 of the carrier C1, and covers this rotating shaft 21 from the radially outer side by the rotating shaft 21 being inserted inside of it. Annular bearings BR5 and BR6 are arranged between the cylindrical portion 91*c* and the rotating shaft 21, and the cylindrical portion 91*c* and the rotating shaft 21 are mutually supported by these bearings BR5 and BR6. Therefore, the rotating shaft 21 is able to rotate relative to the cylindrical portion 91*c* (i.e., the cylinder member 91) in the circumferential direction. Also, the cylindrical portion 91*c* is inserted inside the MG1 rotating shaft (rotor) 12, and is covered from the radially outer side by this MG1 rotating shaft 12. Annular bearings BR7 and BR8 are arranged between the cylindrical portion 91*c* and the MG1 rotating shaft 12, and the cylindrical portion 91*c* and the MG1 rotating shaft 12 are mutually supported by these bearings BR7 and BR8. Therefore, the MG1 rotating shaft 12 is able to rotate relative to the cylindrical portion 91*c* in the circumferential direction.

An oil passage $91c_1$ for the clutch CL1, and an oil passage $91c_2$ for the brake BK1 are formed inside the wall surface of the cylindrical portion 91*c*. The oil passage $91c_1$ for the clutch CL1 is communicated with the oil passage 71*a* for the clutch CL1 of the cover wall 71. Also, the oil passage $91c_2$ for the brake BK1 is communicated with the oil passage 71*b* for the brake BK1 of the cover wall 71. These oil passage $91c_1$ and $91c_2$ each have an oil passage that extends in the axial direction, and are isolated from each other by a phase difference in the circumferential direction.

The oil passage $91c_1$ for the clutch CL1 is communicated with an oil passage 81*a* formed in a radially inside portion of the cylinder member 81. This oil passage 81*a* is a through-hole that communicates an outer peripheral surface side (i.e., the side with the cylinder member 91) of the radially inside portion of the cylinder member 81 with an inner peripheral surface side (i.e., the side with the oil chamber of the clutch CL1) thereof. As a result, operating oil is able to move back and forth between the oil passage $91c_1$ and the oil chamber of the clutch CL1. Therefore, the clutch CL1 is able to perform both an engagement operation and a release operation. In this example, two annular seal members 76 are arranged between the inner peripheral surface of the radially inside portion of the cylinder member 81, and the outer peripheral surface of the radially inside portion of the cylinder member 91 (FIG. 10), thus inhibiting operating oil from leaking out from a connecting portion of the oil passage 81*a* and the oil passage $91c_1$.

On the other hand, the oil passage $91c_2$ for the brake BK1 is communicated with an oil passage $91a_1$ formed in the wall portion 91*a*. This oil passage $91a_1$ has an oil passage that extends in the radial direction, inside a wall surface of the wall portion 91*a*. This oil passage $91a_1$ is communicated with the oil chamber of the brake BK1. As a result, operating oil is able to move back and forth between the oil passage $91a_1$ and the oil chamber of the brake BK1. Therefore, the brake BK1 is able to perform an engagement operation and a release operation.

As described above, in the hybrid system 1-1 of this example embodiment, even if the first rotary machine MG1 having a large outside diameter is arranged on the vehicle front side, the oil passages of the operating oil for the clutch CL1 and the brake BK1 of the power transmitting apparatus that are arranged farther to the vehicle rear side than the first rotary machine MG1 are able to be ensured. Therefore, with this hybrid system 1-1, the first rotary machine MG1 that has a large outside diameter is able to be arranged toward the vehicle front side, so mountability in the vehicle is able to be improved.

Here, in this hybrid system 1-1, the speed change device 20 and the like is able to be assembled in the housing 61 as described below.

First, a worker inserts the speed change device 20, the clutch CL1, and the brake BK1 into the first connecting member 73, and attaches the differential device 30 to the outside of the first connecting member 73. The worker then blocks the opening of the first connecting member 73 with the second connecting member 74, fastens the second connecting member 74 with the snap ring 75, and houses this assembled part inside the housing 61.

Next, the worker houses the partition wall 72 inside the housing 61, and fastens the two together with a bolt or the like. The bearing BR2 may also be attached to the partition wall 72. Then, the worker houses the first rotary machine MG1 with the resolver R and the bearing BR1 and the like attached, inside the housing 61, while inserting it into the cylindrical portion 91*c* of the brake BK1, and fits the MG1 rotating shaft (rotor) 12 into the second connecting member 74. Then the worker inserts the cover wall 71 into the cylindrical portion 91*c*, closing off the opening of the housing 61.

Figure 11:
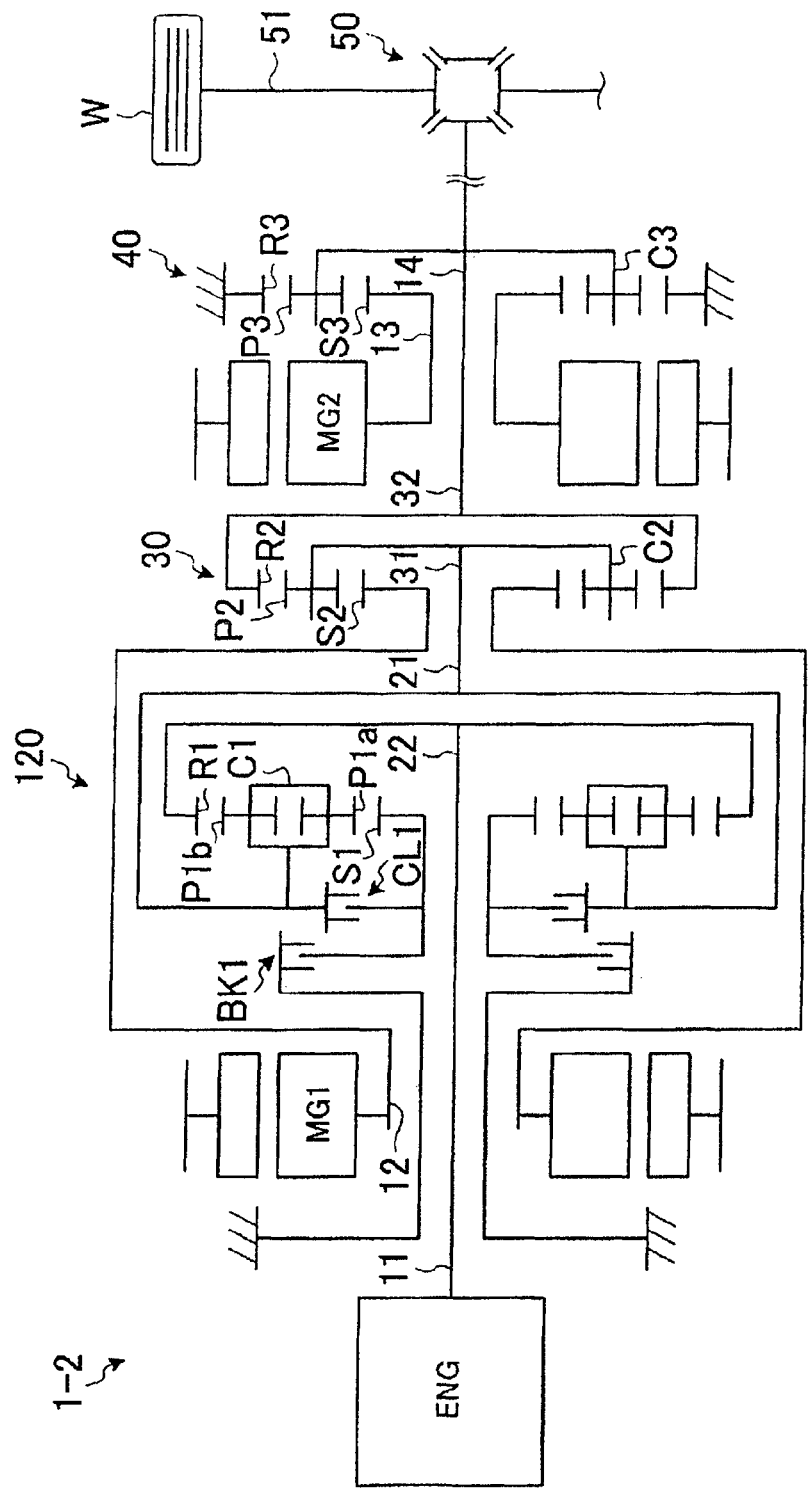
FIG. 11 is a skeleton view of the structure of a first modified example of the hybrid system according to the invention.

A hybrid system according to a first modified example is denoted by reference character 1-2 in FIG. 11. This hybrid system 1-2 is the same as the hybrid system 1-1 of the example embodiment, but with a speed change device 120 instead of the speed change device 20. Therefore, in this hybrid system 1-2 as well, oil passages of the operating oil for the clutch CL1 and the brake BK1 are configured and arranged just as they are in the hybrid system 1-1 of the example embodiment. Therefore, the hybrid system 1-2 of this modified example is able to improve mountability in the vehicle, similar to the example embodiment.

Here, the speed change device 120 of the modified example is provided with a planetary gear unit, similar to the example embodiment. The planetary gear unit of this example is a double pinion planetary gear unit, and has a sun gear S1, a ring gear R1, a plurality of pinion gears P1*a* and P1*b*, and a carrier C1, as a plurality of rotating elements (i.e., speed-changing rotating elements) capable of differential rotation. In this speed change device 120, one of the sun gear S1, the ring gear R1, and the carrier C1, is connected to the engine ENG and one of the remaining two is connected to the differential device 30. In this example, the engine rotating shaft 11 and the ring gear R1 are connected via the rotating shaft 22 so as to be able to rotate together as a unit. Also in this example, the carrier C2 of the differential device 30 is connected to the carrier C1 via the rotating shafts 21 and 31. The parts to which the clutch CL1 and the brake BK1 are connected are the same as they are in the example embodiment.

Figure 12:
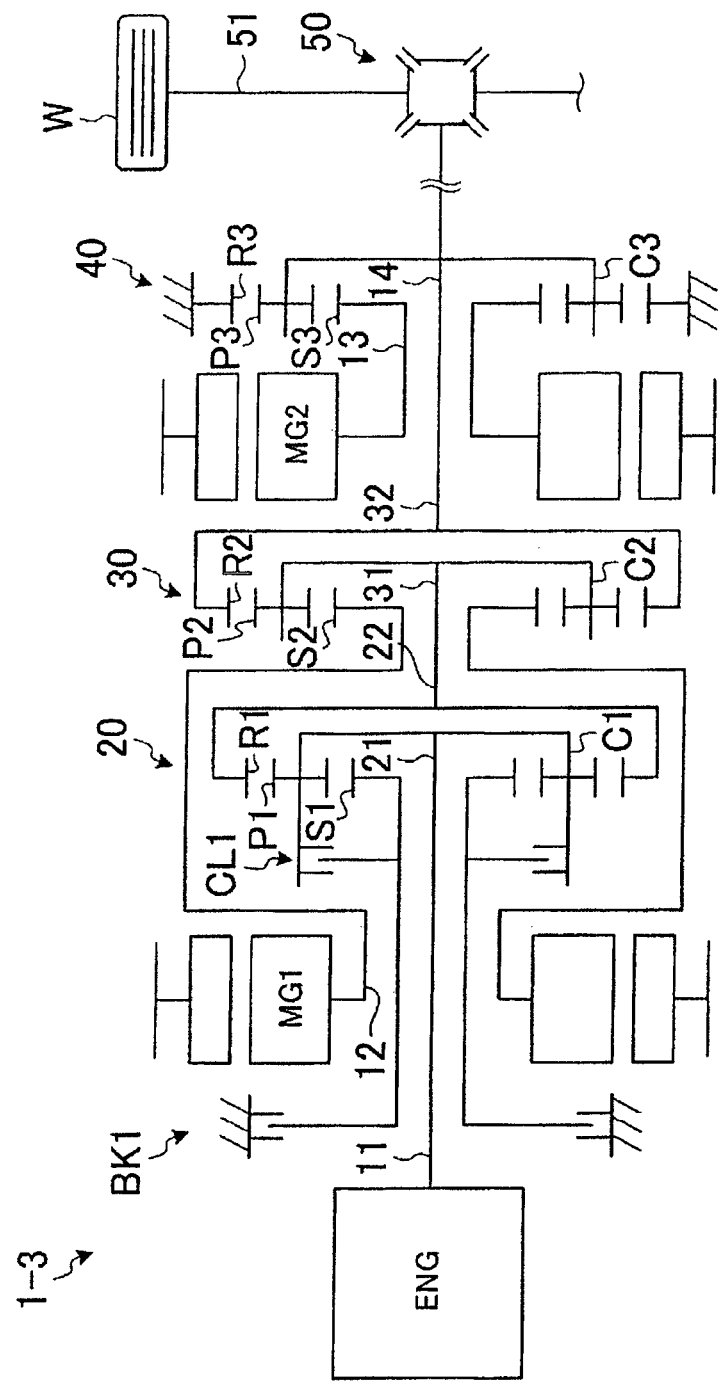
FIG. 12 is a skeleton view of the structure of a second modified example of the hybrid system according to the invention.
Figure 13:
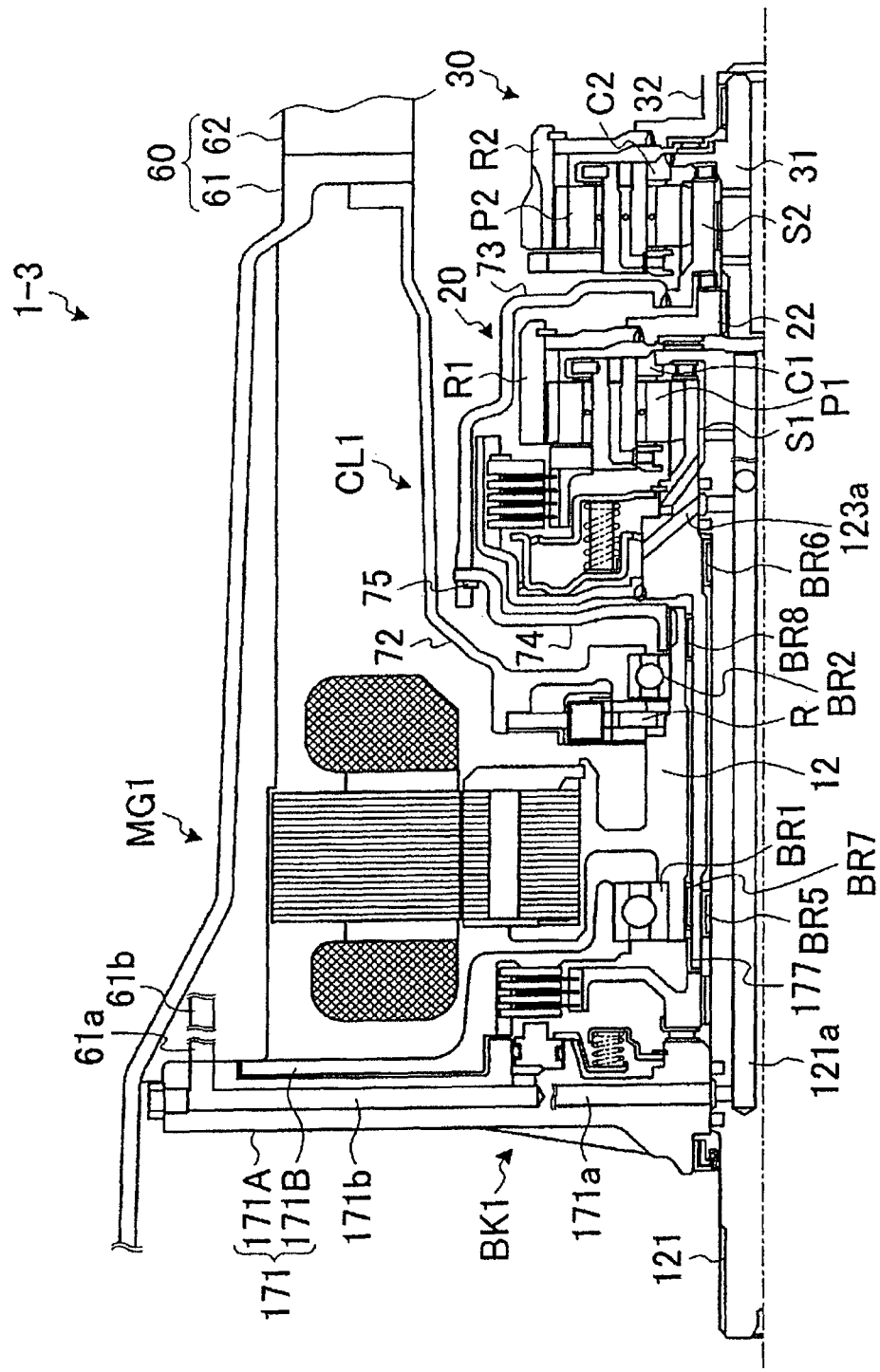
FIG. 13 is a sectional view of the structure of the inside of a case of the hybrid system of the example embodiment.

A hybrid system according to a second modified example is denoted by reference character 1-3 in FIGS. 12 and 13. This hybrid system 1-3 is the same as the hybrid system 1-1 of the example embodiment, except for that the brake BK1 is moved to the vehicle front side of the first rotary machine MG1. That is, in this hybrid system 1-3, the engine ENG, the brake BK1, the first rotary machine MG1, the clutch CL1, the speed change device 20, the differential device 30, and the second rotary machine MG2 are arranged on the same axis in this order from the vehicle front side.

In the hybrid system 1-3, the changes described below with respect to the hybrid system 1-1 are made due to the change in the arrangement of the brake BK1. Reference characters in FIG. 13 that are used in FIGS. 2 and 10 in the example embodiment denote the same parts and the like as they do in the example embodiment, so descriptions of thereof will be omitted.

In this modified example, the one cover wall 71 in the example embodiment is replaced with a cover wall 171 shown in FIG. 13. This cover wall 171 has a two-part structure that includes a first cover member 171A and a second cover member 171B that are arranged lined up in the vehicle longitudinal direction. In this cover wall 171, the first cover member 171A is arranged on the vehicle front side, and the second cover member 171B is arranged on the vehicle rear side. These first and second cover members 171A and 171B are fixed at radially outside portions thereof to the housing 61. Therefore, the cover wall 171 is unable to rotate in the circumferential direction, just like the cover wall 71 of the example embodiment. Also, a radially inside portion of the first cover member 171A is inserted into a rotating shaft 121 of the carrier C1 of the speed change device 20. This rotating shaft 121 extends farther to the vehicle front side than the cover wall 171, just like the rotating shaft 21 of the example embodiment. A radially inside portion of the second cover member 171B is attached to the MG1 rotating shaft (rotor) 12 via a bearing BR1.

In this modified example, a brake BK1 is arranged in an annular space on the vehicle front side formed on the radially inside of the first rotary machine MG1 (i.e., in a space on the radially inside of the stator) (FIG. 13). Therefore, some of the function of the brake BK1 is assumed by the cover wall 171. This brake BK1 is arranged in an annular space provided between the first cover member 171A and the second cover member 171B. This space is formed in a bulging portion where the radially inside portion of the second cover member 171B bulges out toward the vehicle rear side.

Figure 14:
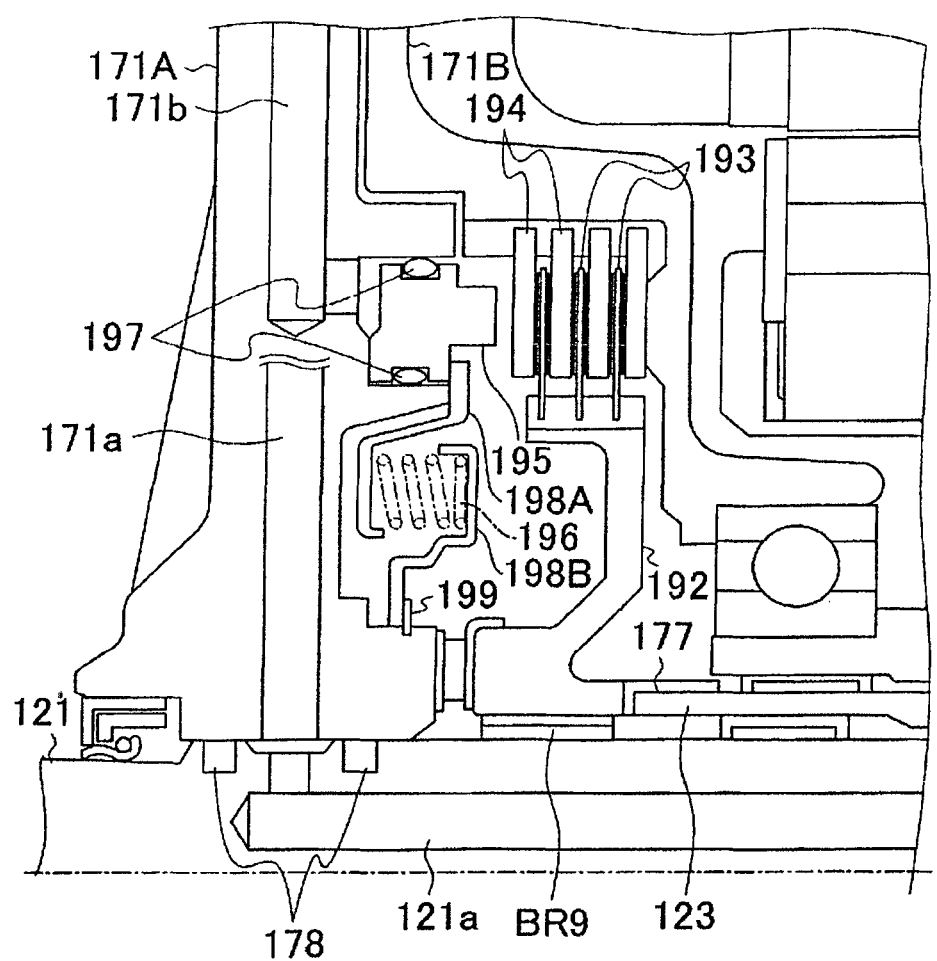
FIG. 14 is an enlarged view of a brake in FIG. 13.

The brake BK1 will be described with reference to FIG. 14. The function of a cylinder member of the brake BK1 is assumed by the second cover member 171B. This second cover member 171B is fixed to the housing 61, so a plurality of annular second plates 194 that serve as the second engagement member are arranged spaced apart in the axial direction, on an inner peripheral surface of the bulging portion of the second cover member 171B. A hub member 192 of the brake BK1 is provided in an annular space formed by this bulging portion. A plurality of annular first plates 193 that serve as the first engagement member are arranged spaced apart in the axial direction, on an outer peripheral surface of the hub member 192. The first plates 193 are provided with friction material on each annular surface in the axial direction, and are arranged between adjacent second plates 194.

This hub member 192 is able to rotate together with the sun gear S1 of the speed change device 20 in the circumferential direction. More specifically, the sun gear S1 of this modified example includes a cylindrical portion 123 that extends in the axial direction toward the vehicle front side. This cylindrical portion 123 extends to the position where the hub member 192 is arranged. This cylindrical portion 123 may be integrally formed with the sun gear S1, or may be fixed to the sun gear S1 by welding or the like. The cylindrical portion 123 is inserted into a gap between the outer peripheral surface of the rotating shaft 121 and the inner peripheral surface of the MG1 rotating shaft (rotor) 12. Annular bearings BR5 and BR6 are provided between the inner peripheral surface of the cylindrical portion 123 and the outer peripheral surface of the rotating shaft 121. Therefore, the cylindrical portion 123 and the rotating shaft 121 are able to rotate relative to one another in the circumferential direction. Also, annular bearings BR7 and BR8 are provided between the outer peripheral surface of the cylindrical portion 123 and the inner peripheral surface of the MG1 rotating shaft 12. Therefore, the cylindrical portion 123 and the MG1 rotating shaft 12 are able to rotate relative to one another in the circumferential direction. A connecting portion 177 is provided between an end portion on the vehicle front side of the cylindrical portion 123 and the hub member 192. This connecting portion 177 is inserted between the end portion on the vehicle front side of the cylindrical portion 123 and the hub member 192 in the axial direction, and is in mesh with these. The connecting portion 177 has a structure that meshes dog teeth provided on the cylindrical portion 123 with dog teeth provided on the hub member 192, for example. Therefore, the hub member 192 is able to rotate together with the sun gear S1 as a unit. An annular bearing BR9 is provided between the inner peripheral surface of the hub member 192 and the outer peripheral surface of the rotating shaft 121.

Meanwhile, an annular piston member 195 that pushes and moves the second plates 194 at the time of engagement is provided on the first cover member 171A. This piston member 195 is arranged in a state able to move back and forth in the axial direction, in an annular groove formed in a vehicle rear side wall surface of the first cover member 171A. An annular seal member 197 is arranged on both a radially outside portion and a radially inside portion, between this groove and the piston member 195. Therefore, an annular, extremely liquid-tight oil chamber is formed between these.

Operating oil for the brake BK1 is supplied to this oil chamber. When the operating oil is supplied to this oil chamber and the hydraulic pressure rises, the piston member 195 moves toward the vehicle rear side and applies pressure to the second plates 194. As a result, the brake BK1 is placed in an engaged state in this case. On the other hand, when the hydraulic pressure in the oil chamber is reduced, the brake BK1 is placed in a released state. In order to create this released state, the brake BK1 is provided with a plurality of elastic members 196 arranged spaced apart in the circumferential direction, an annular first retaining member 198A that retains one end of these elastic members 196, and moves together as a unit with the piston member 195, and an annular second retaining member 198B that retains the other end of these elastic members 196, and is retained by the first cover member 171A. The elastic members 196 generate spring force in advance in the released state, and are compressed as the piston member 195 moves in the direction in which the brake BK1 engages. These elastic members 196 push the piston member 195 back toward the vehicle front side with the spring force generated from their compression, when hydraulic pressure in the oil chamber is reduced. Movement of the second retaining member 198B in the axial direction is regulated by the elastic members 196, and a snap ring 199 provided on a radially outside portion of the first cover member 171A.

Operating oil is supplied from the first cover member 171A to the oil chamber of the brake BK1. An oil passage 171b for the brake BK1 is formed inside a wall surface of the first cover member 171A. This oil passage 171b has an oil passage that extends in the radial direction, and is communicated at a radially outside portion with the oil passage 61b for the brake BK1 of the housing 61, and is communicated at a radially inside portion with the oil chamber of the brake BK1. As a result, operating oil is able to move back and forth between this oil chamber and the oil passage 171b. Therefore, the brake BK1 is able to perform both an engagement operation and a release operation.

An oil passage 171a for the clutch CL1 is also formed inside a wall surface of the first cover member 171A. This oil passage 171a has an oil passage that extends in the radial direction, and is communicated at a radially outside portion with the oil passage 61a for the clutch CL1 of the housing 61. This oil passage 171a and the oil passage 171b for the brake BK1 are formed isolated from each other by a phase difference in the circumferential direction. This oil passage 171a is communicated with an oil passage 121a of the rotating shaft 121. This oil passage 121a has an oil passage that extends in the axial direction. In this example, two annular seal members 178 are arranged between the first cover member 171A and the rotating shaft 121, thus inhibiting operating oil from leaking out from a connecting portion of the oil passage 171a and the oil passage 121a.

Figure 15:
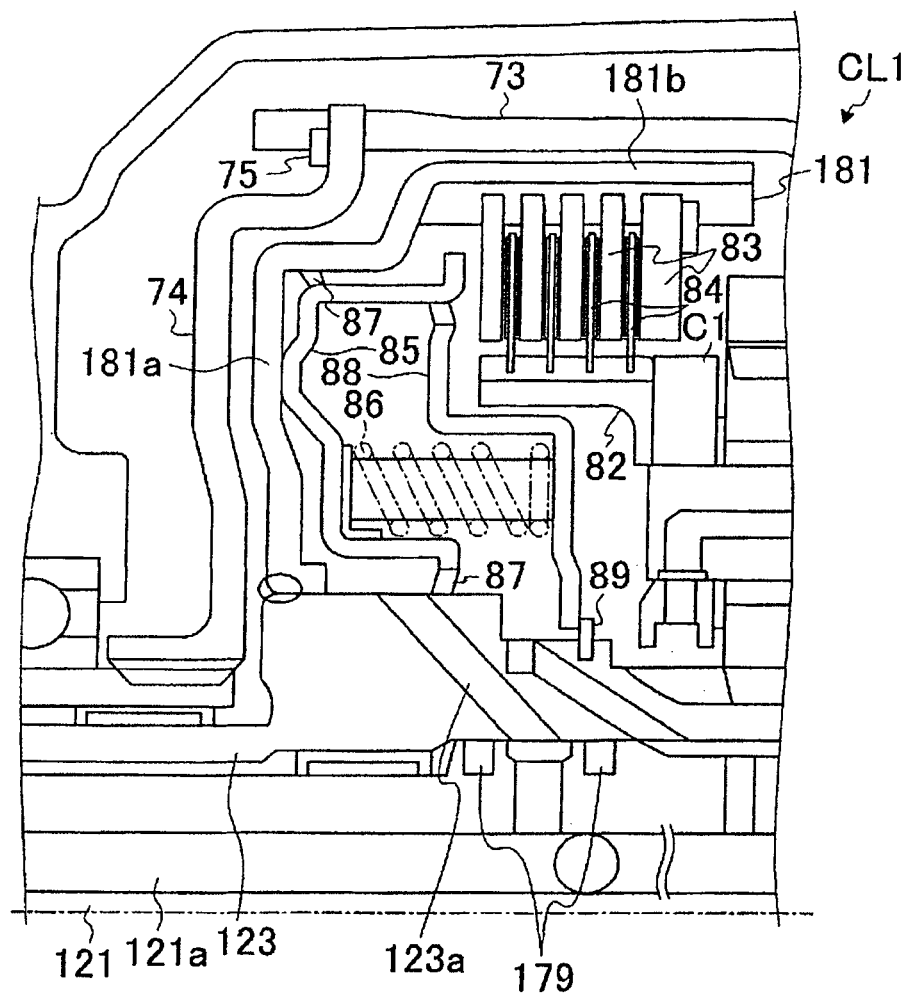
FIG. 15 is an enlarged view of a clutch in FIG. 13.

The clutch CL1 of this modified example is similar to the clutch CL1 of the example embodiment, but differs from the clutch CL1 of the example embodiment with respect to the points described below. The clutch CL1 of this modified example is the same as the clutch CL1 in the example embodiment, except for that a cylinder member 181 is used instead of the cylinder member 81 (FIG. 15). This cylinder member 181 includes a disk-like disk portion 181a, and a cylindrical portion 181b that extends toward the vehicle rear side from a radially outside portion of this disk portion 181a. A through-hole that is concentric with the cylindrical portion 123 of the sun gear S1 is formed in this disk portion 181a, and the cylindrical portion 123 is inserted into it. This cylinder member 181 is able to rotate together as a unit with the sun gear S1, by the radially inside portion of the disk portion 181a being fixed to the outer peripheral surface of the cylindrical portion 123 by welding or the like.

Also, in the clutch CL1, an annular space is formed by the inner peripheral surface of the cylindrical portion 181b of the cylinder member 181 and the outer peripheral surface of the cylindrical portion 123 of the sun gear S1, and component parts of the clutch CL1, such as the first and second plates 83 and 84, are arranged in this space. The first plates 83 are arranged on the inner peripheral surface of the cylindrical portion 181b.

Also, the radially inside portion of the piston member 85 of this modified example is slidably retained by the outer peripheral surface of the cylindrical portion 123 of the sun gear S1 via the seal member 87, and outer peripheral surface side of the piston member 85 is slidably retained by the inner peripheral surface of the cylindrical portion 181b of the cylinder member 181 via the seal member 87.

As described above, the operating oil of the clutch CL1 is supplied to the oil passage 121a of the rotating shaft 121. Here, in the cylindrical portion 123 of the sun gear S1, a through-hole that communicates the inner peripheral surface side with the outer peripheral surface side is formed, and this through-hole is used as an oil passage 123a of the operating oil for the clutch CL1. This oil passage 123a is communicated at a radially inside portion with the oil passage 121a of the rotating shaft 121, and is communicated at a radially outside portion with the oil chamber of the clutch CL1. As a result, operating oil is able to move back and forth between the oil passage 121a and the oil chamber of the clutch CL1 via the oil passage 123a. Therefore, the clutch CL1 is able to perform both an engagement operation and a release operation. In this example, two annular seal members 179 are arranged between the outer peripheral surface of the rotating shaft 121, and the inner peripheral surface of the cylindrical portion 123, thus inhibiting operating oil from leaking out from a connecting portion of the oil passage 121*a* and the oil passage 123*a*.

As described above, in the hybrid system 1-3 of this modified example, even if the first rotary machine MG1 that has a large outside diameter is arranged on the vehicle front side, an oil passage of operating oil for the clutch CL1 of the power transmitting apparatus that is arranged farther to the vehicle rear side than the first rotary machine MG1 is able to be ensured. Therefore, with this hybrid system 1-3, the first rotary machine MG1 that has a large outside diameter is able to be arranged toward the vehicle front side, so mountability in the vehicle is able to be improved.

Here, in this hybrid system 1-3, the speed change device 20 and the like is able to be assembled in the housing 61 as described below.

First, a worker inserts the speed change device 20 and the clutch CL1 into the first connecting member 73, and attaches the differential device 30 to the outside of the first connecting member 73. The worker then blocks the opening of the first connecting member 73 with the second connecting member 74, fastens the second connecting member 74 with the snap ring 75, and houses this assembled part inside the housing 61.

Next, the worker houses the partition wall 72 inside the housing 61, and fastens the two together with a bolt or the like. The bearing BR2 may also be attached to the partition wall 72. Then, the worker houses the first rotary machine MG1 with the resolver R and the bearing BR1 and the like attached, inside the housing 61, while inserting it into the cylindrical portion 123 of the sun gear S1, and fits the MG1 rotating shaft (rotor) 12 into the second connecting member 74. Then the worker inserts the cover wall 171 into the rotating shaft 121 and the cylindrical portion 123 of the sun gear S1, closing off the opening of the housing 61. The brake BK1 is attached to the cover wall 171 beforehand.

Figure 16:
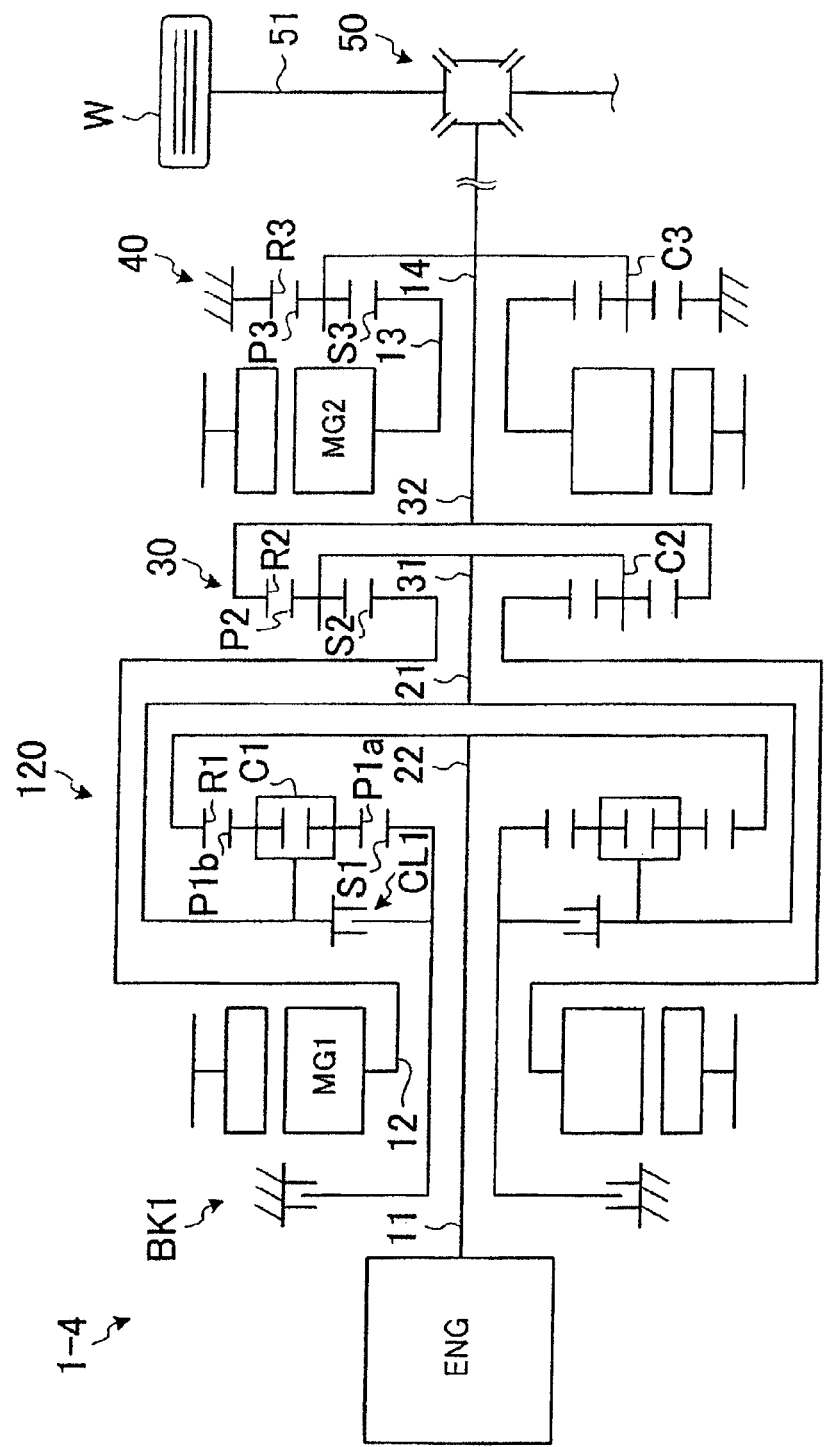
FIG. 16 is a skeleton view of the structure of a third modified example of the hybrid system according to the invention.

A hybrid system according to a third modified example is denoted by reference character 1-4 in FIG. 16. This hybrid system 1-4 is the same as the hybrid system 1-3 of the second modified example, but with the speed change device 120 of the first modified example (i.e., the double pinion planetary gear unit) instead of the speed change device 20. In this speed change device 120, one of the sun gear S1, the ring gear R1, and the carrier C1 is connected to the engine ENG, and one of the remaining two is connected to the differential device 30. In this example, the engine rotating shaft 11 and the ring gear R1 are connected via the rotating shaft 22 so as to be able to rotate together as a unit. Also in this example, the carrier C2 of the differential device 30 is connected to the carrier C1 via the rotating shafts 21 and 31. The parts to which the clutch CL1 and the brake BK1 are connected are the same as they are in the second modified example.

In this hybrid system 1-4 as well, the oil passages of the operating oil for the clutch CL1 and the brake BK1 are configured and arranged just as they are in the hybrid system 1-3 of the second modified example. Therefore, the hybrid system 1-4 of this modified example is able to improve mountability in the vehicle in the same way that the second modified example is.

Figure 17:
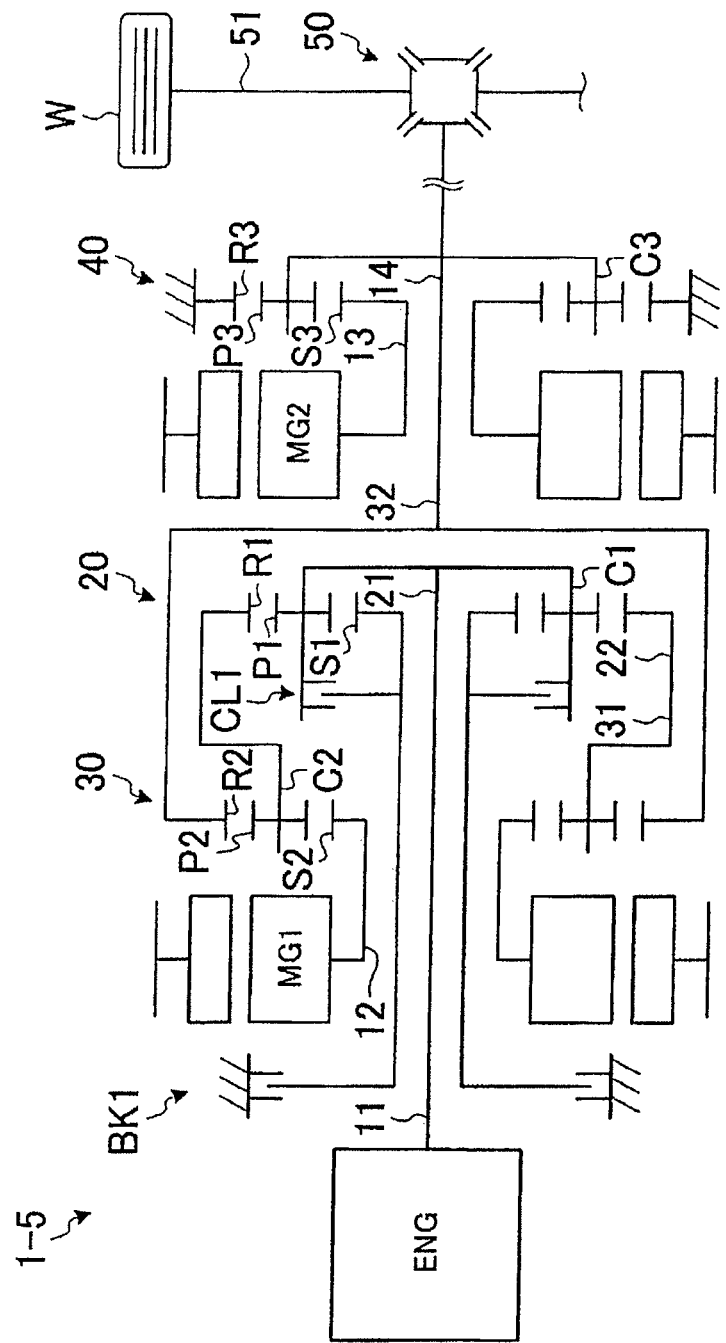
FIG. 17 is a skeleton view of the structure of a fourth modified example of the hybrid system according to the invention.

A hybrid system according to a fourth modified example is denoted by reference character 1-5 in FIG. 17. This hybrid system 1-5 is the same as the hybrid system 1-3 of the second modified example, except with the arrangement of the speed change device 20 and the differential device 30 switched around. In this hybrid system 1-5, the engine ENG, the brake BK1, the first rotary machine MG1, the differential device 30, the clutch CL1, the speed change device 20, and the second rotary machine MG2 are arranged on the same axis in this order from the vehicle front side.

This hybrid system 1-5 is like the hybrid system 1-3 of the second modified example, except with the arrangement of the speed change device 20 and the differential device 30 switched around, but there is no change with respect to the parts to which the sun gear S1, the ring gear R1, and the carrier C1 of the speed change device 20 are connected, and the parts to which the sun gear S2, the ring gear R2, and the carrier C2 of the differential device 30 are connected.

In the hybrid system 1-5 of this modified example, even if the first rotary machine MG1 that has a large outside diameter is arranged on the vehicle front side, an oil passage of operating oil for the clutch CL1 of the power transmitting apparatus that is arranged farther to the vehicle rear side than the first rotary machine MG1 is able to be ensured. Therefore, with this hybrid system 1-5, the first rotary machine MG1 that has a large outside diameter is able to be arranged toward the vehicle front side, so mountability in the vehicle is able to be improved.

Figure 18:
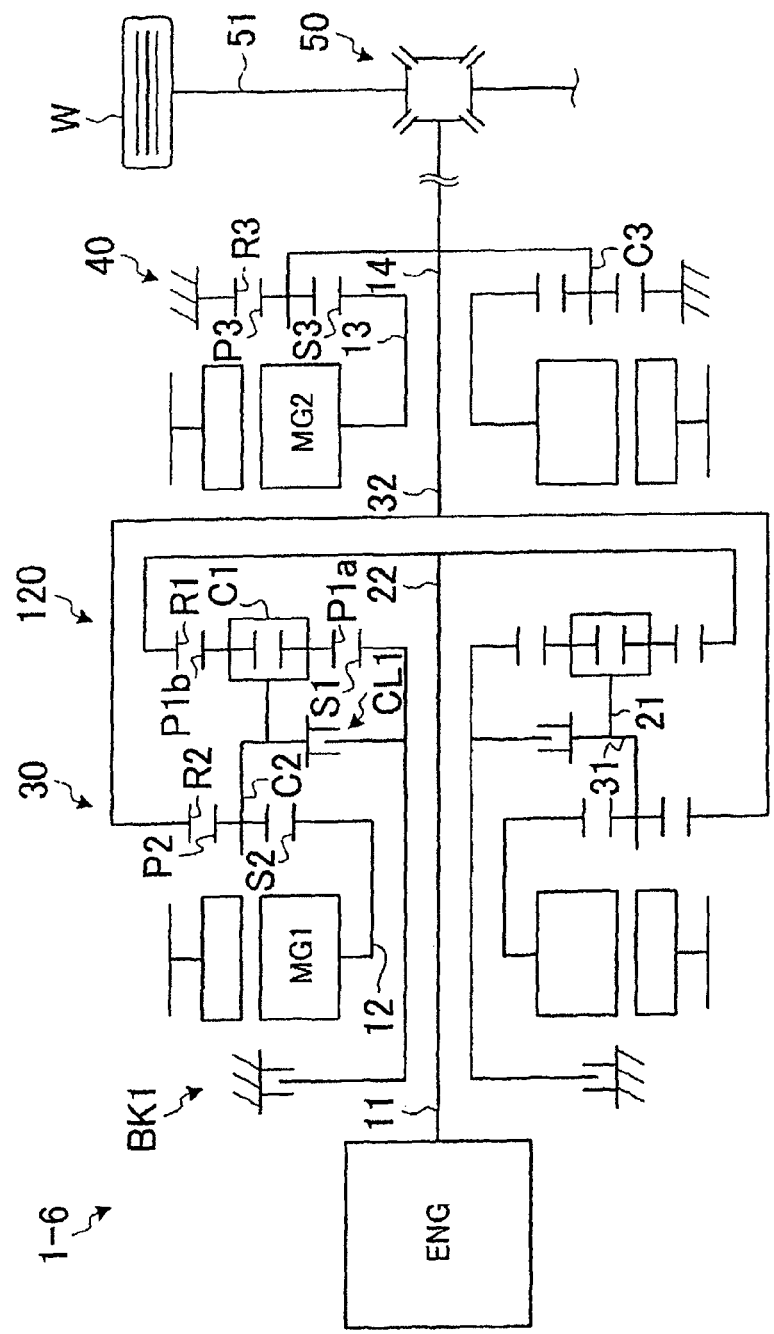
FIG. 18 is a skeleton view of the structure of a fifth modified example of the hybrid system according to the invention.

A hybrid system according to a fifth modified example is denoted by reference character 1-6 in FIG. 18. This hybrid system 1-6 is the same as the hybrid system 1-5 of the fourth modified example, except with the speed change device 120 of the first modified example (i.e., the double pinion planetary gear unit) instead of the speed change device 20. In this speed change device 120, one of the sun gear S1, the ring gear R1, and the carrier C1 is connected to the engine ENG, and one of the remaining two is connected to the differential device 30. In this example, the engine rotating shaft 11 and the ring gear R1 are connected via the rotating shaft 22 so as to be able to rotate together as a unit. Also in this example, the carrier C2 of the differential device 30 is connected to the carrier C1 via the rotating shafts 21 and 31. The parts to which the clutch CL1 and the brake BK1 are connected are the same as they are in the fourth modified example.

In this hybrid system 1-6 as well, the oil passages of the operating oil for the clutch CL1 and the brake BK1 are configured and arranged just as they are in the hybrid system 1-5 of the fourth modified example. Therefore, the hybrid system 1-6 of this modified example is able to improve mountability in the vehicle in the same way that the fourth modified example is.

What is claimed is:

1. A hybrid system comprising:
    an engine;
    a rotary machine;
    a speed change device that has an input shaft, the input shaft being connected to a rotating shaft of the engine;
    a differential device that has a plurality of differential rotating elements capable of differential rotation, the plurality of differential rotating elements including a first differential rotating element to which an output shaft of the speed change device is connected, and a second differential rotating element to which a rotating shaft of the rotary machine is connected;
    a first engagement device configured to shift the speed change device, the first engagement device being configured to be actuated by hydraulic pressure, the first engagement device including a first oil chamber, the rotary machine being arranged between the first engagement device and the engine;
    a case within which the rotary machine, the speed change device, the differential device, and the first engagement device are housed, the case being connected to the engine, and the case having an opening on the engine side; and a cover wall that covers the opening, operating oil being supplied to the first oil chamber via the cover wall.

2. The hybrid system according to claim 1, further comprising:
a first oil passage arranged inside the cover wall; and
a second oil passage that connects the first oil passage to the first oil chamber.

3. The hybrid system according to claim 2, further comprising:
a second engagement device being configured to shift the speed change device, the second engagement device being configured to be actuated by hydraulic pressure, the second engagement device being arranged inside the case, and the rotary machine being arranged between the second engagement device and the engine,
wherein the second oil passage is provided in the second engagement device.

4. The hybrid system according to claim 3, wherein
the second engagement device includes a second oil chamber,
the hybrid system further comprising:
a third oil passage arranged inside the cover wall; and
a fourth oil passage that connects the third oil passage to the second oil chamber, the fourth oil passage provided in the second engagement device.

5. The hybrid system according to claim 2, further comprising:
a second engagement device being configured to shift the speed change device, the second engagement device being configured to be actuated by hydraulic pressure, the second engagement device being arranged inside the case, and the second engagement device being arranged between the rotary machine and the engine,
wherein the second oil passage is provided in the input shaft of the speed change device.

6. The hybrid system according to claim 5, wherein
the second engagement device includes a second oil chamber,
the hybrid system further comprising a third oil passage that is arranged inside the cover wall, and the third oil passage is configured to supply operating oil to the second oil chamber.

* * * * *